(12) United States Patent
Daoust et al.

(10) Patent No.: US 9,868,866 B2
(45) Date of Patent: Jan. 16, 2018

(54) METHOD OF FORMING A HYDROLYSIS RESISTANT AQUEOUS EMULSION

(71) Applicant: Dow Corning Corporation, Midland, MI (US)

(72) Inventors: Jennifer A. Daoust, Midland, MI (US); Jean-Paul H. Lecomte, Brussels (BE); Donald Taylor Liles, Midland, MI (US); Yihan Liu, Midland, MI (US); Timothy Andrew Roggow, II, Chesaning, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/759,456

(22) PCT Filed: Mar. 12, 2014

(86) PCT No.: PCT/US2014/024356
§ 371 (c)(1),
(2) Date: Jul. 7, 2015

(87) PCT Pub. No.: WO2014/159598
PCT Pub. Date: Oct. 2, 2014

(65) Prior Publication Data
US 2015/0353744 A1    Dec. 10, 2015

Related U.S. Application Data

(60) Provisional application No. 61/780,067, filed on Mar. 13, 2013.

(51) Int. Cl.
C09D 7/12 (2006.01)
C04B 41/84 (2006.01)
(Continued)

(52) U.S. Cl.
CPC .......... C09D 7/1233 (2013.01); C04B 41/009 (2013.01); C04B 41/4916 (2013.01);
(Continued)

(58) Field of Classification Search
CPC ... C04B 41/64; C04B 41/009; C04B 41/4916; C04B 41/4964; C09D 7/1233
See application file for complete search history.

(56) References Cited

U.S. PATENT DOCUMENTS 5,001,186 A    3/1991   Liles
5,091,002 A    2/1992   Schamberg et al.
(Continued)

Primary Examiner — Jessee Roe
Assistant Examiner — Alexander Polyansky
(74) Attorney, Agent, or Firm — Timothy J. Troy

(57) ABSTRACT

A hydrolysis resistant aqueous emulsion includes a hydrolyzable silicon containing compound. This emulsion is formed by a method that includes the step of (A) forming a seed emulsion that includes (1) an emulsifier, (2) water, and (3) a first oil phase. The method also includes the step of (B) adding a second oil phase, including a hydrolyzable silicon containing compound, to the seed emulsion. A weight ratio of the second oil phase including the hydrolyzable silicon containing compound to the first oil phase in the seed emulsion is from 0.5 to 50. Moreover, a total weight of the first and second oil phases in the emulsion is at least 60 weight percent.

15 Claims, 20 Drawing Sheets

(51) Int. Cl.
    *C04B 41/64*     (2006.01)
    *C04B 41/00*     (2006.01)
    *C04B 41/49*     (2006.01)
    *D21J 1/08*     (2006.01)
    *C08L 83/04*     (2006.01)
    *C04B 111/00*     (2006.01)
    *C08G 77/12*     (2006.01)

(52) U.S. Cl.
    CPC .......... *C04B 41/4961* (2013.01); *C04B 41/64* (2013.01); *C04B 41/84* (2013.01); *C08L 83/04* (2013.01); *D21J 1/08* (2013.01); *C04B 2111/00293* (2013.01); *C08G 77/12* (2013.01)

(56) References Cited

U.S. PATENT DOCUMENTS

| | | |
|---|---|---|
| 5,726,270 A | 3/1998 | Craig |
| 5,900,460 A | 5/1999 | Craig |
| 6,147,156 A * | 11/2000 | Yamaya ............... C09D 183/10 524/588 |
| 6,403,163 B1 | 6/2002 | Fisher et al. |
| 2006/0122323 A1 | 6/2006 | Dumont et al. |

* cited by examiner

METHOD OF FORMING A HYDROLYSIS RESISTANT AQUEOUS EMULSION

CROSS-REFERENCE TO RELATED APPLICATIONS

This application is a national stage entry of International Patent Application No. PCT/US2014/024356, filed Mar. 12, 2014, which claims the benefit of U.S. Provisional Patent Application No. 61/780,067, filed Mar. 13, 2012, the content of each of which are incorporated herein by reference in their entirety.

BACKGROUND OF THE DISCLOSURE

Imparting or improving water repellency of a substrate is desired for a number of substrates including organic or inorganic building components, for example, concrete, masonry, stucco, natural or artificial stone, ceramic, terracotta bricks, plaster board, fiber cement board, or other cement containing products, wood particle board, wood plastic composites, oriented strand board (OSB) or wood.

Desired water repellency properties are typically obtained by applying a water-repellent composition to an external surface of a substrate so as to create a water repellent coating on the substrate which protects the substrate from weathering and other deterioration. Most typically, at least an outermost surface of the substrates is treated to allow the substrate to be considered waterproof.

Silicones are known water repellents due to durability, hydrophobicity, and ease of application. For example, silicone resins in solvents and methylsiliconates have been used as water repellents. Siloxanes and silanes have also been utilized. However, these compounds tend to exhibit Volatile Organic Contents (VOCs) of more than 100 g/l which can be problematic. Accordingly, there remains an opportunity to develop improved products.

SUMMARY OF THE DISCLOSURE

This disclosure provides a method of forming a hydrolysis resistant aqueous emulsion that includes a hydrolyzable silicon containing compound. The method includes the step of (A) forming a seed emulsion that includes (1) an emulsifier, (2) water, and (3) a first oil phase. The method also includes the step of (B) adding a second oil phase, including a hydrolyzable silicon containing compound, to the seed emulsion. A weight ratio of the second oil phase including the hydrolyzable silicon containing compound to the first oil phase in the seed emulsion is from 0.5 to 50. Moreover, a total weight of the first and second oil phases in the emulsion is at least 60 weight percent. This disclosure also provides the aforementioned emulsion itself.

DETAILED DESCRIPTION OF THE DISCLOSURE

Figure 1A:
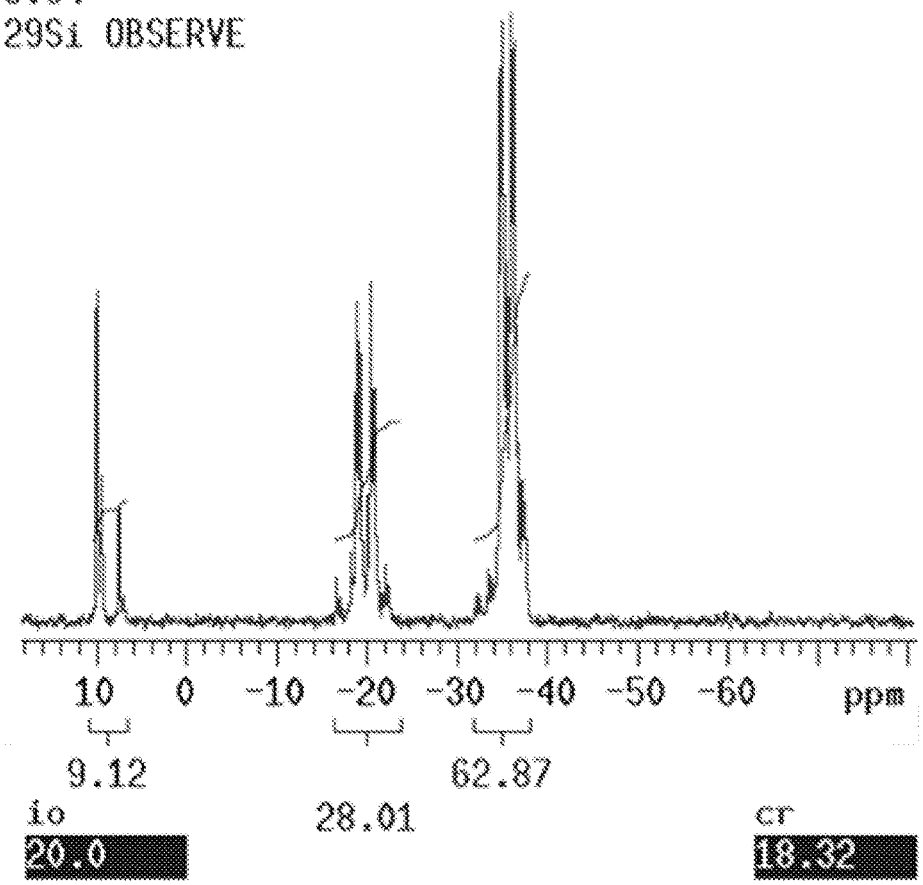
FIG. 1A is a $^{29}$Si NMR spectrum of the Dow Corning® 2-5084 Fluid.

This disclosure provides a method of forming a hydrolysis resistant aqueous emulsion and the emulsion itself. The emulsion includes a hydrolyzable silicon containing compound and typically includes water and an emulsifier. The terminology "hydrolysis resistant" describes that the hydrolysis resistant aqueous emulsion includes the hydrolyzable silicon containing compound in a substantially non-hydrolyzed form. In other words, most of the hydrolyzable silicon containing compound, even though in an aqueous emulsion, is not hydrolyzed. This is particularly useful for applications wherein the hydrolysis resistant aqueous emulsion may be applied to a substrate and the hydrolyzable silicon containing compound can be hydrolyzed on the surface so as to further react with the substrate to provide waterproofing or water resistant properties to the substrate. For example, a prematurely hydrolyzed compound in the emulsion may undergo condensation immediately after hydrolysis and thus become non-reactive to the surface thereby becoming mostly, if not entirely, unusable for waterproofing. In various embodiments, a ratio of a molar concentration of water to a total molar concentration of the hydrolyzable silicon containing compound(s) in the aqueous emulsion is less than 2, 1.9, 1.8, 1.7, 1.6, 1.5, 1.4, 1.3, 1.2, 1.1, 0.9, 0.8, 0.7, 0.6, 0.5, 0.4, 0.3, 0.2, or 0.1.

In various embodiments, resistance to hydrolysis may be quantified, for example, when less than 50 molar percent of hydrolysable groups of the hydrolyzable silicon containing compound is hydrolyzed in the compound is in the aqueous emulsion as compared with the compound before emulsion. In other embodiments, less than 45, 40, 35, 30, 25, 20, 15, 10, or 5 molar percent of the hydrolysable groups of the hydrolyzable silicon containing compound is hydrolyzed in the compound is in the aqueous emulsion as compared with the compound before emulsion. It is to be appreciated that there can be more than one hydrolysable group attached to a hydrolysable silicon atom. For example, for a methylhydrogen siloxane, there is one hydrolysable group per methylhydrogen silicon. For an alkyltrialkoxysilane, there are three hydrolysable groups per silane silicon.

The hydrolysis resistant emulsion is an aqueous emulsion, i.e., an oil-in-water (O/W) emulsion. O/W emulsions typically include a non-polar dispersed phase (e.g., oil), which form droplets which may be described as emulsion particles, in an aqueous continuous phase (e.g. water). As is known in the art, emulsions are thermodynamically unstable and are stabilized kinetically. Typically, there are several emulsion instability phenomena including (i) flocculation, where droplets of the dispersed phase loosely associate to form clumps, (ii) creaming or sedimentation, where the droplets of the dispersed phase concentrate due to gravitation towards a top or bottom, respectively of the continuous phase, and (iii) coalescence, or breaking, wherein the droplets of the dispersed phase merge to form a bulk liquid phase separate from the continuous phase. The instant seed emulsion and/or hydrolysis resistant aqueous emulsion may exhibit one or more of these instability phenomena to a limited extent even though each is preferably avoided. Independent of emulsion stability, which is a spatial association structure, ingredients in the emulsion can undergo chemical reaction or degradation. This latter instability is generally not considered a part of emulsion stability because those of skill in the art generally assume that ingredients in an emulsion system do not change chemically. However, when chemical reaction occurs in an emulsion, the emulsion often becomes unstable with respect to creaming, sedimentation or coalescence. Relevant to emulsions that contain hydrolysable species, hydrolysis of the oil phase can lead to what is known in the art as Ostwald Ripening, a process that quickly leads to creaming or sedimentation and coalescence, which is preferably avoided.

An emulsion can be in the form of a liquid that flows easily, a cream that flows with much resistance, or a gel that may not appear to the naked eye to flow within practical time frame. The instant seed emulsion and/or hydrolysis resistant aqueous emulsion may be in the form of a cream or a gel, as would be recognized or appreciated by those of skill in the art. These two forms can be achieved by adding thickeners to the emulsion such as polysaccharides, polyvinylalcohols, or clays such as bentonite or montmorillonite and/or by having the dispersed phase content in the emulsion above a particular threshold. In one embodiment, the instant seed emulsion and/or hydrolysis resistant aqueous emulsion is free of a thickener. For emulsions free of thickener and having a droplet size of one, two, or more than two microns, this threshold is typically 60-85% by volume, or if the density is close to that of the water, by weight. Emulsion creams or gels may be difficult to form when the dispersed phase is a fluid of low viscosity (less than 1000 centipoises). Relative to this disclosure, an emulsion (e.g. cream or gel) may be surprisingly formed by continuously dispersing into a seed emulsion the hydrolysable silicon containing compound.

If the emulsion is a gel, the emulsion typically may not appear to flow to the naked eye within any practical time frame. Alternatively the rheological behavior of the gel can be described as viscoelastic, i.e., the response to deformation may include both elastic and viscous character.

If the emulsion is a cream, the emulsion typically flows with great resistivity, as is understood in the art. Alternatively, the cream may be described as a liquid that has a very high viscosity, e.g., above 50,000, from 50,000 to 1,000,000, from 50,000 to 500,000, from 100,000 to 450,000, from 150,000 to 400,000, from 200,000 to 350,000, or from 250,000 to 300,000, or any range thereof, cP measured at 25° C.

The hydrolysis resistant aqueous emulsion may be free of, or include less than 10, 9, 8, 7, 6, 5, 4, 3, 2, 1, 0.9, 0.8, 0.7, 0.6, 0.5, 0.4, 0.3, 0.2, 0.1, or 0.05, weight percent of one or more thickeners. Typical thickeners include polysaccharides, polyvinylalcohols, or clays such as bentonite or montmorillonite.

Hydrolyzable Silicon Containing Compound:

The hydrolysis resistant aqueous emulsion includes the hydrolyzable silicon containing compound, typically SiH functional or alkoxy functional. The hydrolyzable silicon containing compound is not particularly limited except that it includes at least one silicon atom and includes at least one group that can be hydrolyzed, such as —SiCl, —SiNR$_2$, —SiOR, —SiO$_2$CR, —SiON(CR$_2$), —SiOC(CH$_3$)(CH$_2$), —SiH, —SiN(R)C(O)R, where R is a monovalent radical containing 1-18 carbons, typically an alkyl group, and combinations thereof. In various embodiments, the hydrolyzable silicon containing compound is chosen from silanes, siloxanes, and combinations thereof. In one embodiment, the hydrolyzable silicon containing compound is a silane, e.g. an alkylalkoxysilane. In another embodiment, the hydrolyzable silicon containing compound is a siloxane, e.g. an organohydrogensiloxane. In still another embodiment, the hydrolyzable silicon containing compound is a silicone or a resin obtained by hydrolysis and condensation of silanes or a mixture of silanes and resins bearing potentially different alkyl or aryl groups.

In still another embodiment, the hydrolyzable silicon containing compound is chosen from:

(i) an organohydrogensiloxane having the formula;

wherein:
R is an alkyl radical having 1 to 4 carbon atoms;
R' is an alkyl radical having 1 to 18 carbon atoms;
R''' is hydrogen or R;
a is a number from 0 to 35;
b is a number from 0 to 32; and
c and d are each independently a number from 1 to 10, (ii) an alkoxysilane having the formula:

wherein:
R'' is an alkyl radical having 1 to 18 carbon atoms or an aryl radical;
Z is a hydrogen atom, an alkyl group having 1 to 4 carbon atoms, CH$_3$C(O)—, CH$_3$CH$_2$C(O)—, HOCH$_2$CH$_2$—, CH$_3$OCH$_2$CH$_2$—, or C$_2$H$_5$OCH$_2$CH$_2$—;
x has an average value from 0 to 2,
y has an average value from 0.1 to 4, and
x+y has a value equal to or less than 4.

Relative to (i), R may be an alkyl radical having 1, 2, 3, or 4 carbon atoms, or any range thereof. In addition, R' may be an alkyl radical having 1, 2, 3, 4, 5, 6, 7, 8, 9, 10, 11, 12, 13, 14, 15, 16, 17, or 18 carbon atoms, or any range thereof. Moreover, a may be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35, or any range thereof. Furthermore, b may be 0 or may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32, or any range thereof. Even further, each of c and d may independently be 1, 2, 3, 4, 5, 6, 7, 8, 9, or 10, or any range thereof.

Relative to (ii), R" may be an alkyl radical having 1, 2, 3, 4, 5, 6, 7, 8, 9, 10, 11, 12, 13, 14, 15, 16, 17, or 18 carbon atoms, or any range thereof. It is also contemplated that R" may alternatively be an aryl group, e.g. a phenyl group. Z may be an alkyl group having 1, 2, 3, or 4 carbon atoms. In addition, x may have an average value of 0, 0.1, 0.2, 0.3, 0.4, 0.5, 0.6, 0.7, 0.8, 0.9, 1.1, 1.2, 1.3, 1.4, 1.5, 1.6, 1.7, 1.8, 1.9, or 2.0, or any range thereof. Moreover, y may have an average value of 0.1, 0.2, 0.3, 0.4, 0.5, 0.6, 0.7, 0.8, 0.9, 1.1, 1.2, 1.3, 1.4, 1.5, 1.6, 1.7, 1.8, 1.9, 2.0, 3.1, 3.2, 3.3, 3.4, 3.5, 3.6, 3.7, 3.8, 3.9, or 4.0, or any range thereof. In addition, x+y may have any value of at least 0.1 and up to an including 4, for example, 0.1, 0.2, 0.3, 0.4, 0.5, 0.6, 0.7, 0.8, 0.9, 1.1, 1.2, 1.3, 1.4, 1.5, 1.6, 1.7, 1.8, 1.9, 2.0, 3.1, 3.2, 3.3, 3.4, 3.5, 3.6, 3.7, 3.8, 3.9, or 4.0, or any range thereof. In other embodiments, c is less than 3, d is equal to or greater than 2 and the sum of c and d is between 4 and 6. Suitable non-limiting examples of (ii) are alkylalkoxy silanes or resins such as Dow Corning Products Z-6586, Z-6341, Z-6288, Z-6289, MR-2404, DC 3074, 3037 intermediates, and/or combinations thereof.

Referring to the method, the method includes the step of (A) forming a seed emulsion including water, an emulsifier, and a first oil phase, and (B) adding a second oil phase including a hydrolyzable silicon containing compound to the seed emulsion to form the final hydrolysis resistant aqueous emulsion. The terminology "seed emulsion" describes an emulsion, typically an aqueous emulsion (O/W emulsion) as described above. The oil phase of the seed emulsion may be the same, similar, or different than that of the final hydrolysis resistant aqueous emulsion of this disclosure.

In one embodiment, the precise nature of the seed emulsion is not critical so long as the oil phase of the seed emulsion may not chemically react with the second oil phase to be added in (B). In another embodiment, the first oil phase of the seed emulsion can be either miscible or immiscible with the second oil phase (B). In various embodiments, the seed emulsion has a viscosity greater than 100, greater than 500, from 100 to 10,000, from 100 to 7,000, from 100 to 5,000, from 100 to 2,000, from 200 to 1,900, from 300 to 1,800, from 400 to 1,700, from 500 to 1,600, from 600 to 1,500, from 700 to 1,400, from 800 to 1,300, from 900 to 1,200, or from 1,000 to 1,100, or any range thereof, cP measured at 25° C.

(A) Forming the Seed Emulsion:

The seed emulsion includes an emulsifier, water, and the first oil phase, described above. The emulsifier, water, and the oil phase may be added together independently or in any combination thereof. The seed emulsion can be prepared according to any emulsification method. In particular, the emulsifier, water and oil phase of the seed emulsion can be combined together in any order followed by subjecting the mixture to a homogenization process. Alternative, the seed emulsion can be prepared by adding the oil phase to the mixture of emulsifier and water while under homogenization. Still alternatively, the seed emulsion can be prepared by adding water or water including part or all of the emulsifier to the first oil phase including part or all of the emulsifier while under mixing to form an initial water-in-oil (W/O) emulsion and subsequently subjecting the mixture to homogenization to invert the W/O emulsion to an O/W emulsion. Homogenization may describe any of the rigorous mixing action with medium to high energy shear power.

Emulsifier:

The emulsifier is not particularly limited and may be further described as being or including a surfactant. The emulsifier may have the ability to stabilize the seed emulsion. In various embodiments, the emulsifier is or includes an anionic surfactant, cationic surfactant, non-ionic surfactant, amphoteric surfactant, or combinations thereof. Non-ionic surfactants and anionic surfactants are typically used in combination. Suitable non-limiting non-ionic surfactants include condensates of ethylene oxide with linear or branched alcohols or fatty acids such as a $C_{8-18}$ alcohol, condensates of ethylene oxide with an amine or an amide, condensation products of ethylene and propylene oxide, esters of glycerol, sucrose, sorbitol, fatty acid alkylol amides, sucrose esters, and fatty amine oxides. Silicone surfactant and fluoro surfactants can also be used. Examples of commercially available non-ionic surfactants include alcohol ethoxylates sold under the trade name BRIJ, Synperonic™, Renex™ by Croda, Edison, N.J., Lutensol® by BASF (Florham Park, N.J.). Some examples are BRIJ L23, an ethoxylated alcohol known as polyoxyethylene (23) lauryl ether, and BRIJ L4, another ethoxylated alcohol known as polyoxyethylene (4) lauryl ether, Lutensol® XP-70 and Lutensol® XP-140, Synperonic 13-6 and Synperonic 13-12, all ethoxylated alcohols. Additional non-ionic surfactants include ethoxylated alcohols sold under the trademark TERGITOL® by The Dow Chemical Company, Midland, Mich., including TERGITOL® 15-S-5, TERGITOL® 15-S-12, TERGITOL®15-S-15, and TERGITOL® 15-S-40. Sorbitan esters and their ethoxylated derivatives can also be used. Examples include those sold under the trade name Span™ and Tween™, such as Span 20, Tween 20, Span 80 and Tween 80, by Croda. Examples of silicone surfactant include silicone polyethers sold under the trade name Dow Corning Fluids by Dow Corning Corporation, Midland, Mich., such as Dow Corning® Q2-5247 Fluid and Dow Corning® Q2-5211 Superwetting Agent. Using a silicone superwetting agent can have an enhanced water repellent effect. When mixtures of surfactants are used, at least one surfactant may have a low Hydrophile-Lipophile Balance (HLB), for example, below 12, and one or more others may have a high HLB above 12, such that the combined effective HLB is within the range 9 to 20 or 10 to 18. In various non-limiting embodiments, one or more emulsifiers/surfactants may be used as described in U.S. Pat. No. 6,074,470, incorporated herein by reference relative to these non-limiting embodiments.

Representative examples of suitable anionic surfactants include alkali metal soaps of higher fatty acids, alkylaryl sulphonates such as sodium dodecyl benzene sulphonate, long chain fatty alcohol sulphates, olefin sulphates and olefin sulphonates, sulphated monoglycerides, sulphated esters, sulphonated ethoxylated alcohols, sulphosuccinates, alkane sulphonates, phosphate esters, alkyl isethionates, alkyl taurates, and alkyl sarcosinates.

Representative examples of suitable cationic surfactants include alkylamine salts, quaternary ammonium salts, sulphonium salts, and phosphonium salts. Representative examples of suitable amphoteric surfactants include imidazoline compounds, alkylamino acid salts, and betaines.

The emulsifier may be present in the seed emulsion in an amount of from 1 to 40, 5 to 35, 5 to 30, 10 to 30, 15 to 25, 20 to 25, or 10 to 20, or ranges thereof, weight percent based on a weight of the seed emulsion. The emulsifier may be present in the overall hydrolysis resistant aqueous emulsion in an amount of from 0.01 to 20, 0.1 to 5, 0.5 to 3, 0.5 to 2.5, 1 to 2, or 1.5 to 2, or ranges thereof, weight percent based on a total weight of the hydrolysis resistant aqueous emulsion Water:

Referring back to the water, the water may be tap water, well water, purified water, deionized water, and combinations thereof and may be present in the seed emulsion in varying amounts. For example, the water may be present in amounts of from 20 to 80, of from 30 to 70, of from 40 to 60, or in an amount of about 50, parts by weight per 100 parts by weight of the seed emulsion. Water may also be present in the overall hydrolysis resistant aqueous emulsion, for example in amounts of from 0.1 to 40, 0.5 to 20, 1 to 10, 1, 2, 3, 4, 5, 6, 7, 8, 9, or 10, or any range thereof, weight percent.

First/Second Oil Phases:

Referring to the first oil phase, the first oil phase may be present in the seed emulsion in an amount from 10 to 90, 15 to 85, 20 to 80, 25 to 75, 30 to 70, 35 to 65, 40 to 60, 45 to 55, or 50 to 55, or any range thereof, weight percent of the seed emulsion. The first oil phase may be present in the overall hydrolysis resistant aqueous emulsion in amounts of from greater than 0 to greater than 99 percent, from 5 to 95, from 10 to 90, from 15 to 85, from 20 to 80, from 25 to 75, from 30 to 70, from 35 to 65, from 40 to 60, from 45 to 55, from 60 to 99, 85 to 98, 99, 98, 97, 96, 95, 94, 93, 92, 91, 90, 89, 88, 87, 86, or 85, from 95 to 95, from 70 to 90, from 75 to 85, or from 80 to 85, or any range thereof, weight percent of the overall hydrolysis resistant aqueous emulsion.

The second oil phase may be present in the overall hydrolysis resistant aqueous emulsion in an amount of at least 50, 55, 60, 65, 70, 75, 80, 85, 90, 95, 96, 97, 98, or 99, from 50 to 95, from 55 to 90, from 60 to 85, from 65 to 80, or from 70 to 75, or any range thereof, weight percent based on the overall weight of the hydrolysis resistant aqueous emulsion. In various embodiments, a total weight of the first and second oil phases in the emulsion is at least 60 or at least 70 weight percent. In various embodiments, the total weight is at least 60, 65, 70, 75, 80, 85, 90, 91, 92, 93, 94, 95, 96, 97, 98, or 99 weight percent. In still other embodiments, the total weight is from 60 to 99, 65 to 99, 70 to 99, 75 to 99, from 80 to 99, from 85 to 99, from 90 to 99, from 95 to 99, from 75 to 95, from 80 to 90, from 80 to 95, from 85 to 95, from 80 to 85, etc.

The first and/or second oil phases may be or include the hydrolyzable silicon containing compound, a non-hydrolyzable silicon containing compounds, as described below, a silicone oil, a hydrocarbon oil or a fluorocarbon oil, or combinations thereof, so long as the hydrolysis resistant aqueous emulsion includes the hydrolyzable silicon containing compound. Non-limiting examples of the silicone oil include linear or cyclic polydiorganosiloxane such as a polydimethylsiloxane of various molecular weight, a hydroxy terminated polydimethylsiloxane of various molecular weight, octamethylcyclotetrasiloxane, decamethylcyclopentasiloxane, or combinations thereof. Examples of silicone oil can also include liquid or solid silicone resins. In the case of a solid silicone resin, the resin may be miscible with the hydrolyzable silicon containing compound to form a liquid mixture. Silicone oil in general can be expressed by the structure formula $M_xD_yT_pQ_q$, as known in the art. For example, M, D, T, and Q represent the functionality of structural units that can be present in organosilicon compound including siloxane units. The monofunctional (M) unit represents $R_3SiO_{1/2}$; the difunctional (D) unit represents $R_2SiO_{2/2}$; the trifunctional (T) unit represents $R_1SiO_{3/2}$; and the tetrafunctional (Q) unit represents $SiO_{4/2}$ wherein x, y, p, and/or q are positive numbers and R may be a monovalent hydrocarbon group having 1, 2, 3, 4, 5, 6, 7, 8, 9, 10, 11, 12, 13, 14, 15, 16, 17, or 18, or any range thereof, carbon atoms. Non-limiting examples of the hydrocarbon oil include aliphatic or aromatic compounds that are liquid at room temperature, such as mineral oil, ISOPAR, white spirit.

In various embodiments, the hydrolyzable silicon containing compound is present in the first and/or second oil phases in any one or more of the aforementioned weight percents. In other embodiments, the hydrolyzable silicon containing compound in the first and/or second oil phases is present in amounts from 10 to 100, or 50 to 100, or 80 to 100 parts per 100 parts of the entire oil phase of the final emulsion. Similarly, any one or more of the silicone oil, hydrocarbon oil, and/or fluorocarbon oil may be present in a balance weight percent to the hydrolyzable silicon containing compound in the first and/or second oil phases and/or present in any one or more of the aforementioned weight percents.

In one embodiment, the first oil phase comprises a hydrolyzable silicon containing compound that may be the same or different from the hydrolyzable silicon containing compound in the second oil phase of (B). In another embodiment, the hydrolyzable silicon containing compound of the first oil phase is different from the hydrolyzable silicon containing compound of the second oil phase. In still another embodiment, hydrolyzable silicon containing compound of the second oil phase is a hydrolyzable silane. In a further embodiment, the hydrolyzable silicon containing compound of the second oil phase is a hydrolyzable siloxane. Alternatively, the hydrolyzable silicon containing compound of the first oil phase is a hydrolyzable silane. In an additional embodiment, the hydrolyzable silicon containing compound of the first oil phase is a hydrolyzable siloxane.

In other embodiments, each of the hydrolyzable silicon containing compounds of the first and/or second oil phases is independently chosen from the compounds of (i) and (ii) above, i.e., the compounds corresponding to formulae (I), (II), and (III). For example, the hydrolyzable silicon containing compound of the first and/or second oil phase may be (I), may be (II), may be (III), or may be one or more combinations thereof.

In addition to the hydrolyzable silicon containing compound, the seed emulsion (e.g. first oil phase) and/or the hydrolysis resistant aqueous emulsion (e.g. second oil phase) may also include one or more non-hydrolyzable silicon containing compounds. Similarly, the method may include the step of adding the non-hydrolyzable silicon containing compound to the first and/or second oil phases, the seed emulsion and/or the overall hydrolysis resistant aqueous emulsion. The non-hydrolyzable silicon containing compound may be chosen from silicone oils, hydrocarbon oils, silanes, siloxanes, and combinations thereof. In other embodiments, the non-hydrolyzable silicon containing compound may be a dimethyl siloxane or a siloxane or silane having methyl aryl, methyl alkyl, or a non-functional group, e.g. amino, such as in an aminosiloxane, or a carbinol.

(B) Adding the Second Oil Phase to the Seed Emulsion:

Referring back to the method, the method also includes the step of (B) adding the second oil phase to the seed emulsion. The second oil phase containing the hydrolyzable silicon containing compound may be added to the seed emulsion continuously at a constant rate or incrementally in discrete steps while the emulsion is under continuous mixing. The mixing rate may correlate with the addition rate of the second oil phase such that the oil phase can be completely incorporated into the emulsion and yet without having the emulsion subject to excess shear. Typically, when the second oil phase addition rate is high, mixing speed may be set high, otherwise some portion of the added oil phase may not incorporate as dispersed phase in the emulsion. When the oil phase addition rate is low, mixing speed may be set low. Mixing speed can be high but high shear is typically to be avoided during oil addition. High shear during oil addition can result incomplete oil dispersion in the final emulsion. High shear can be applied once all oil phase has been incorporated into the emulsion as dispersed phase. Such high shear application after the complete addition of the oil phase can further reduce the emulsion particle size. High shear devices include mixers using the Cowles blade, rotor stators, colloid mill, high pressure homogenizer and sonolators.

The second oil phase including the hydrolyzable silicon containing compound is added in an amount such that a weight ratio of the second oil phase including the hydrolyzable silicon containing compound to the first oil phase in the seed emulsion is from 0.5 to 50, 5 to 45, 10 to 40, 15 to 35, 20 to 30, or 20 to 25, or any range thereof. In various embodiments, the weight ratio is from 1 to 40, from 5 to 30, etc.

In other embodiments, the hydrolyzable silicon containing compound and/or the hydrolysis resistant aqueous emulsion as a whole, each independently has a Volatile Organic Content (VOC) below 100, 95, 90, 85, 80, 75, 70, 65, 60, 55, 50, 45, 40, 35, 30, 25, 20, 15, 10, or 5, g/L measured according to ASTM 5095. In various embodiments, it is also contemplated that VOC may be measured by one or more additional methods known in the art and that the hydrolyzable silicon containing compound and/or the hydrolysis resistant aqueous emulsion as a whole may have a VOC as enumerated above.

The method may also include the step of adding a second emulsifier along with step (B). The second emulsifier may be the same or different from the emulsifier used in the seed emulsion as described above. The second emulsifier can be added to the seed emulsion alongside of the second oil phase in a continuous manner at a constant rate or incrementally in discrete steps; or the second emulsifier can be mixed in the second oil phase and be added together.

The second oil phase can include one or more hydrolysable silicon containing compounds. The second oil phase can also include one or more hydrolysable silicon containing compounds with additional non-hydrolysable silicon containing compounds such as a silicone oil, a hydrocarbon oil and a fluorocarbon oil. The various ingredients in the second oil phase can added to the seed emulsion separately, in sequence or in mixed order, or they can be mixed first and then added to the seed emulsion as a mixture.

This disclosure also provides a method applying a hydrolysis resistant aqueous emulsion to a substrate. The substrate may be oriented at any angle relative to a support. For example, the substrate may be oriented approximately perpendicularly (i.e., at approximately 90°) to the support or horizontally, or at any angle. In one embodiment, the substrate is chosen from cement, clays, lime, gypsum or natural stone, concrete, mortar, masonry, cement, stucco, natural or artificial stone, ceramic, terracotta bricks, plaster board, fiber cement board, cellulosic substrates, wood, composite particle board, wood plastic composites, oriented strand board, medium density fiber board, and combinations thereof. In another embodiment, the substrate is chosen from regular concrete, high strength concrete, stamped concrete, high performance concrete, self consolidating concrete, shotcrete, cellular concrete, lightweight aerated concrete, variable density concrete, foamed concrete, lightweight or ultralightweight concrete, rapid strength concrete, pre-stressed concrete or reinforced concrete for use in pavements, highways/roadways, bridges/overpasses, parking structures, stadiums, precast structures, tilt up structures, drainage pipes, tunnels or reservoir structures, concrete masonry units, concrete blocks, split faced blocks, natural stone or bricks for use on building facades or foundations, and combinations thereof. The support may be the same as the substrate or may be different. The support may be any portion, in whole or in part, of any one of the various substrates described above.

The hydrolysis resistant aqueous emulsion may be applied to the substrate by spraying, pouring, knife-coating, rolling, brushing, or applied mechanically with a spatula, or combinations thereof. The hydrolysis resistant aqueous emulsion may also be applied as an admixture in the bulk of the ingredients when manufacturing the substrate.

In various embodiments, the emulsion is applied to the substrate in a thickness of less than 2, 1.9, 1.8, 1.7, 1.6, 1.5, 1.4, 1.3, 1.2, 1, 0.9, 0.8, 0.7, 0.6, 0.5, 0.4, 0.3, 0.2, 0.1, 0.05, or 0.01, millimeters, or any ranges thereof. In other embodiments, the emulsion may not flow towards the support more than 5 cm from an original point of application. In other embodiments, the emulsion may not flow towards the bottom more than 5 cm from an original point of application on a vertical surface. The emulsion is typically not "free flowing" and may include a yield point. This is to say that the emulsion may be able to flow only if the constraint applied is larger than a given threshold value. Gravity is typically not large enough to move a material with a yield point. Applied on a vertical surface, the instant hydrolysis resistant aqueous emulsion will typically not flow downward by more than 5 cm from the original point of application.

EXAMPLES

Dow Corning® Z-70 Emulsion is an aqueous emulsion containing 60% hydroxy terminated polydimethylsiloxane.

Dow Corning® IE-6694 Water Repellent Emulsion includes 60% silicon-containing compounds.

Dow Corning® Z-6341 Silane is n-octyltriethoxysilane.

Dow Corning® 2-5084 Fluid is a SiH functional siloxane including structural units M(Me, Me, Me), D(Me, Me), D(Me, H) and D(Me, R'), where Me=$CH_3$—, R' is an alkyl radical having 1 to 18 carbon atoms, and M and D stand for $SiO_{1/2}$ and $SiO_{2/2}$ structural units, respectively.

SiH Fluid B is a SiH functional siloxane including structural units D(Me, Me), D(Me, H) and D(Me, R'), with symbols defined as above.

To form SiH Fluid B, a 3-neck round bottom flask was equipped with an overhead mechanical stirrer, thermometer, condenser, and pressure-compensated addition funnel which was connected on top of the condenser. A mixture of cyclic methylhydrogen siloxanes (including approximately 52% tetramethylcyclotetrasiloxane, 43% pentamethylcyclopentasiloxane and 5% hexamethylcyclohexaasiloxane) was poured into the flask and an addition funnel was charged with 1-octene, at an amount such that a molar ratio of alkene to SiH groups was 0.5:1. A small portion of the 1-octene was added to the reaction vessel and the reaction mixture was heated to 70° C. The reaction was then catalyzed with a standard platinum hydrosilylation catalyst (chloroplatinic acid, 0.5 ppm Pt in the reaction) resulting in a rapid exothermic increase to ~85-90° C. Slow addition of the 1-octene was immediately started to maintain the reaction temperature between 90-100° C. The reaction temperature was maintained at or above 90° C. so that a steady state could be maintained wherein a reaction rate was equal to an addition rate, minimizing an unsafe build-up of reactants, which could lead to a rapid, exothermic reaction.

After addition of the 1-octene was complete, the reaction mixture was allowed to gradually cool to room temperature. Then, diallyl maleate was added (0.2 wt. %) as a stabilizer. Finally, the reaction mixture was vacuum stripped. The product had a viscosity of 16 mPas at 20° C., a density of 0.928 g/ml at 20° C. and a VOC content according to ASTM D5095 of 5%. The VOC content of the fluid was 46.4 g/l.

To interpret $^{29}$Si NMR spectra of the SiH containing silicone, the following are peak assignments:
~10 ppm, splits from left to right: M̱(Me, Me, Me)-D(Me, H)
M̱(Me, Me, Me)-D(Me, R');
~20 ppm, splits from left to right:
Ḏ(Me, R') mixed signals from cyclic tetramer (for 5084 this is an impurity)
D(Me,H)-Ḏ(Me, R')-D(Me, H)
D(Me,H)-Ḏ(Me, R')-D(Me, R')
D(Me,R')-Ḏ(Me, R')-D(Me, R')
~36 ppm, splits from left to right:
Ḏ(Me, H) mixed signals from cyclic tetramer
D(Me,H)-Ḏ(Me, H)-D(Me, H)
D(Me,H)-Ḏ(Me, H)-D(Me, R')
D(Me,R')-Ḏ(Me, H)-D(Me, R')
~58 ppm: Ḏ(Me, OH) (absent in non-hydrolyzed system)
~66 ppm: Ṯ(Me) (absent in non-condensed system)
Measurement uncertainty is approximately ±10%. When hydrolysis occurs, the Ḏ(Me, H) peaks at ~36 ppm decreases, meanwhile a peak for Ḏ(Me, OH) at ~58 ppm may appear and with future condensation a peak for Ṯ(Me) at ~66 ppm appears.

Example 1

Surfactant Solution: To a 100 gram maximum Speed Mixer™ cup were weighed 40 grams Hostapur® SAS-30 (Sodium C14-17 alkyl sec sulfonate, an anionic surfactant, 30% active in water), 10 grams Brij® 30 (Laureth-4, a nonionic surfactant), and 50 grams deionized water. The content was mixed at 3500 RPM for 30 seconds using a DAC-150 Speed Mixer™ to arrive at an aqueous surfactant solution.

Seed Emulsion: To a 500 mL stainless steel beaker was added 16 grams of the surfactant solution. The content was stirred using a Lightnin® mixer equipped with an impeller with a marine blade. To the content was added 16 grams of Dow Corning® 2-5084 Fluid, as the oil phase/hydrolyzable silicon containing compound, at a rate of 0.94 grams per minute under a constant stirring speed of 175 RPM. This resulted in formation of a seed emulsion having a volume averaged median particle size of 17 micron, as measured using a Malvern Mastersizer 2000 particle size analyzer.

Dispersion of Second Oil Phase: To 32 grams of the seed emulsion obtained above was added 368 grams of Dow Corning® 2-5084 Fluid, as a second oil phase/hydrolyzable silicon containing compound, at a rate of 0.98 grams per minute under a constant stirring speed of 175 RPM using the same mixer. This resulted in formation of a translucent emulsion including 96% hydrolysable Si compound and 0.88% surfactant. The emulsion had a monomodal particle size distribution centered around a volume averaged median size (Dv(0.5)) of 2.0 microns and a 90 percentile size (Dv(0.9)) of 3.7 microns. The emulsion was kept in closed container at room temperature for two weeks after which it was observed and tested. The appearance and the particle size distribution remained the same.

Figure 1B:
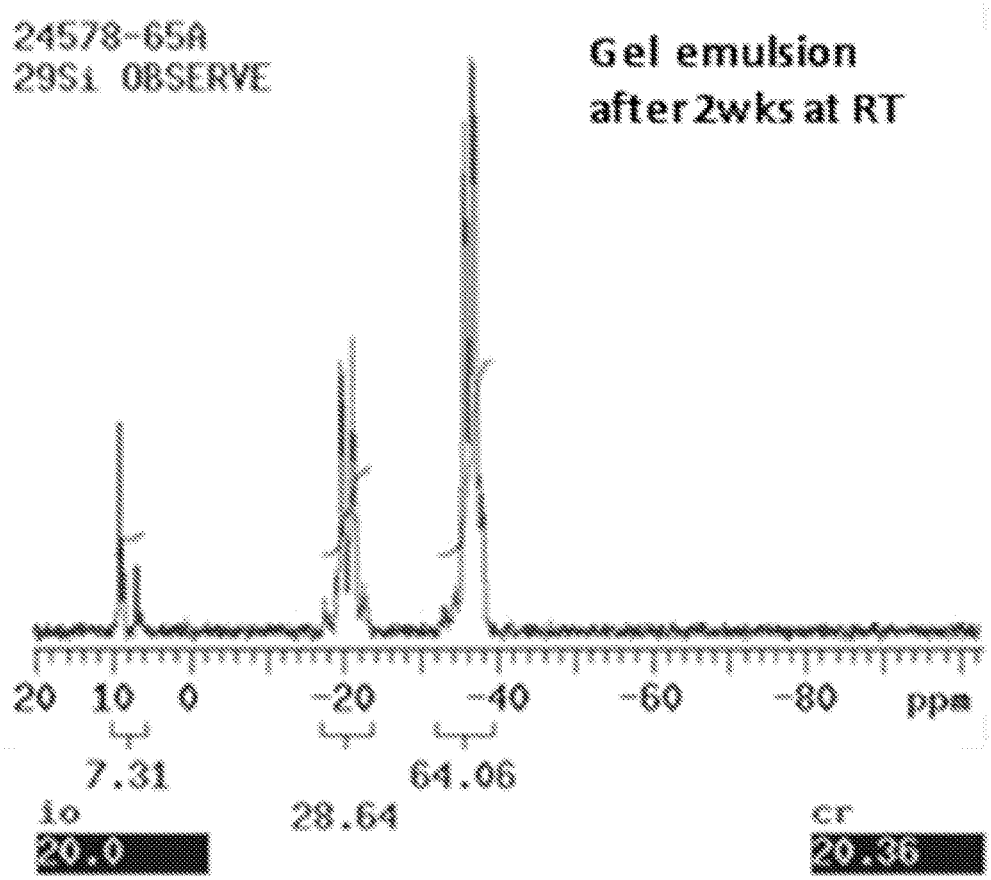
FIG. 1B is a $^{29}$Si NMR spectrum of the emulsion in Example 1 after room temperature aging for 2 weeks.

$^{29}$Si NMR spectra are displayed in FIG. 1 and show no SiH hydrolysis in the emulsion. Thus both the emulsion and the hydrolysable Si compound in the emulsion were stable. FIG. 1A/B are $^{29}$Si NMR spectra of the Dow Corning® 2-5084 Fluid (FIG. 1A) and of the emulsion of Example 1 after room temperature aging for 2 weeks (FIG. 1B).

Example 2

The procedure of Example 1 was followed except that the additional Dow Corning® 2-5084 Fluid, as a second oil phase/hydrolyzable silicon containing compound, was added to the seed emulsion at a rate of 5.11 grams per minute. This resulted in a white emulsion including 96% hydrolysable Si compound and 0.88% surfactant. The emulsion had a bimodal particle size distribution displaying one peak centered around 1 micron and another peak around 9 microns. The emulsion was kept in closed container at room temperature for two weeks after which it was observed and tested. The appearance and the particle size distribution remains essentially the same. $^{29}$Si NMR spectrum is displayed in FIG. 2 which shows negligible SiH hydrolysis.

Figure 2:
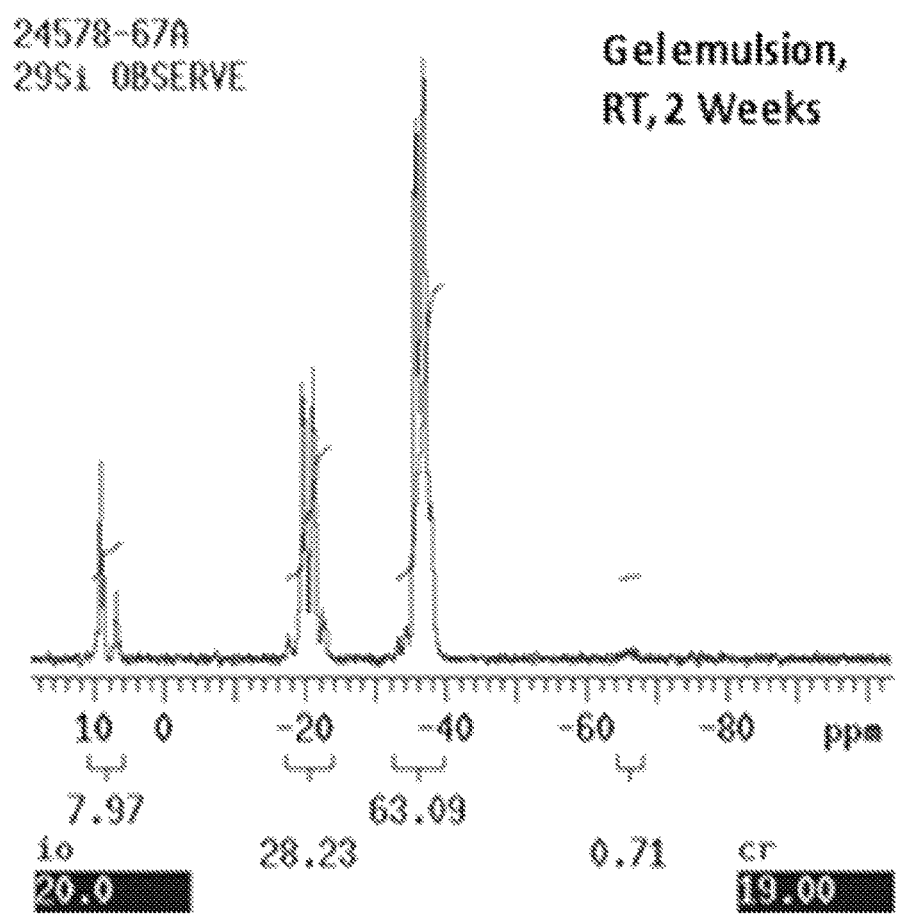
FIG. 2 is a $^{29}$Si NMR spectrum of the fluid in Example 2 after room temperature aging for 2 weeks.

FIG. 2 is a $^{29}$Si NMR spectrum of the emulsion in Example 2 after room temperature aging for 2 weeks. The spectrum is to be compared with that of the Dow Corning® 2-5084 Fluid displayed in FIG. 1A. Peak assignments are as described in FIGS. 1 A/B.

Example 3

Seed Emulsion: To a 50 mL wide-mouth glass jar was added 20 grams of the surfactant solution made according to the procedure in Example 1 and 20 grams of Dow Corning® 2-5084 Fluid. The contents were sonicated using a Misonix Sonicator 3000 Ultrasonic Liquid Processor at maximum power for 30 seconds. The sample was capped and gently toggled, then sonicated again for another 30 seconds. This produced a seed emulsion having a volume averaged median particle size of 0.16 micron, as measured using a Malvern Mastersizer 2000 particle size analyzer.

Dispersion of Second Phase: The dispersion procedure of Example 1 was followed except that the additional Dow Corning® 2-5084 Fluid, as a second oil phase/hydrolyzable silicon containing compound, was added to the seed emulsion at a rate of 5.11 grams per minute. This resulted in a white emulsion including 96% hydrolysable Si compound and 0.88% surfactant. The emulsion had a bimodal particle size distribution displaying one peak centered around 1 micron and another peak around 6.5 microns. The emulsion was kept in closed container at room temperature for two weeks after which it was inspected and tested. The appearance and the particle size distribution remains essentially the same. $^{29}$Si NMR spectrum is displayed in FIG. 3, which shows no hydrolysis beyond measurement uncertainty.

Figure 3:
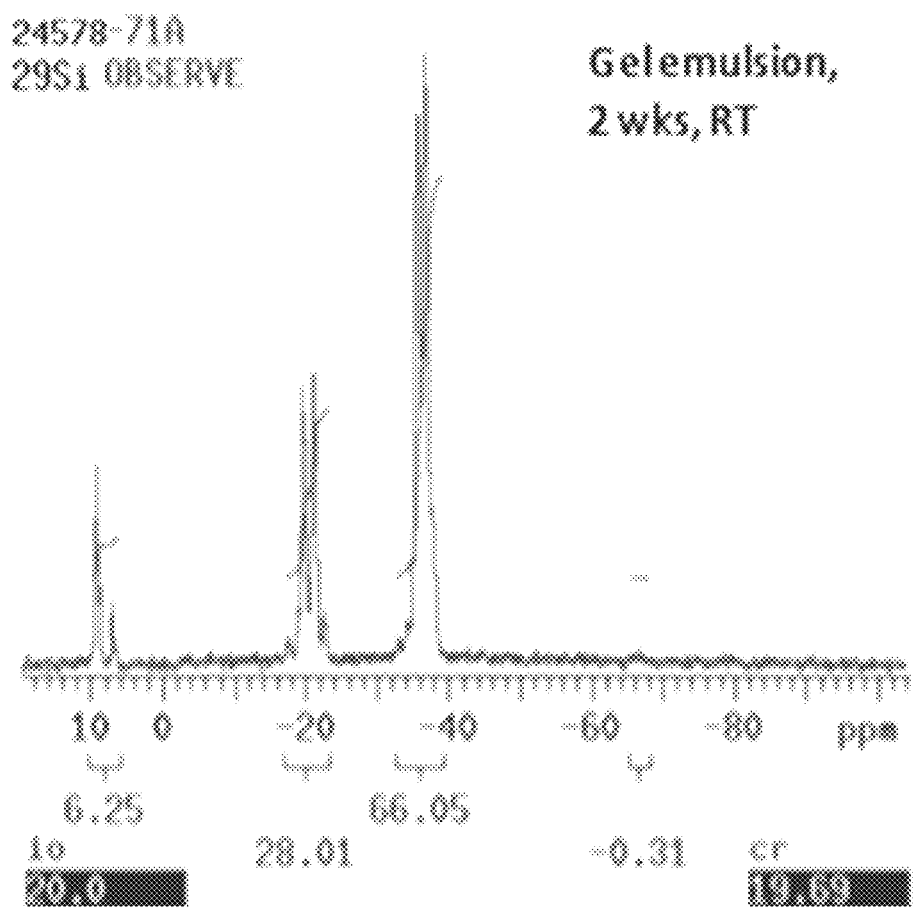
FIG. 3 is a $^{29}$Si NMR spectrum of the emulsion in Example 3 after room temperature aging for 2 weeks.

FIG. 3 is a $^{29}$Si NMR spectrum of the emulsion in Example 3 after room temperature aging for 2 weeks. The spectrum is to be compared with that of the Dow Corning® 2-5084 Fluid displayed in FIG. 1A. Peak assignments are as described in FIG. 1.

Example 4

The procedure of Example 3 was followed except that additional Dow Corning® 2-5084 Fluid, as a second oil phase/hydrolyzable silicon containing compound, was added to the seed emulsion at a rate of 8.98 grams per minute under a constant mixing rate of 800 RPM using the same equipment. This resulted in formation of a white emulsion including 96% hydrolysable Si compound and 0.88% surfactant. The emulsion had a monomodal particle size distribution with Dv(0.5) of 2.5 microns and Dv(0.9) of 3.8 microns. The emulsion was kept in closed container at room temperature for two weeks after which it was observed and tested. A thin oil layer was separated out of the emulsion which was approximately 5 wt % of the emulsion while particle size distribution of the remaining emulsion portion was represented by a Dv(0.5) of 2.5 microns and a Dv(0.9) of 4.2 microns. A $^{29}$Si NMR spectrum is displayed in FIG. 4 which shows no hydrolysis beyond measurement uncertainty.

Figure 4:
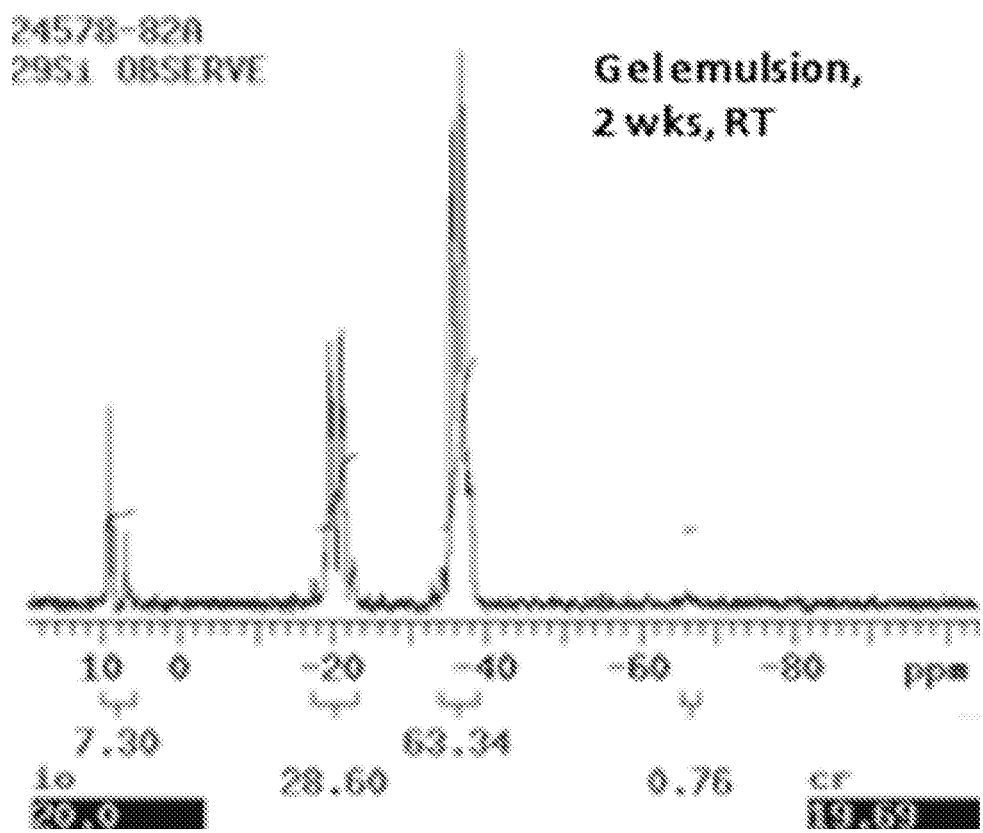
FIG. 4 is a $^{29}$Si NMR spectrum of the emulsion in Example 4 after room temperature aging for 2 weeks.

FIG. 4 is a $^{29}$Si NMR spectrum of the emulsion in Example 4 after room temperature aging for 2 weeks. The spectrum is to be compared with that of the Dow Corning® 2-5084 Fluid displayed in FIG. 1A. Peak assignments are as described in FIG. 1.

Example 5

Seed Emulsion: A seed emulsion was prepared according to the procedure of Example 3. To 72 grams of the seed emulsion was added 328 grams of Dow Corning® 2-5084 Fluid, as a second oil phase/hydrolyzable silicon containing compound, at a rate of 4.63 grams per minute under a constant stirring speed of 175 RPM using the same mixer as in Example 1. This resulted in a white creamy emulsion including 91% of the hydrolysable Si compound and 1.98% surfactant. The creamy emulsion had a bimodal particle size distribution displaying one peak centered around 0.85 micron and another peak around 10 microns. The emulsion was kept in closed container at room temperature for two weeks after which it was inspected and tested. The appearance and the particle size distribution remained essentially the same. $^{29}$Si NMR spectrum is displayed in FIG. 5 and show negligible SiH hydrolysis.

Figure 5:
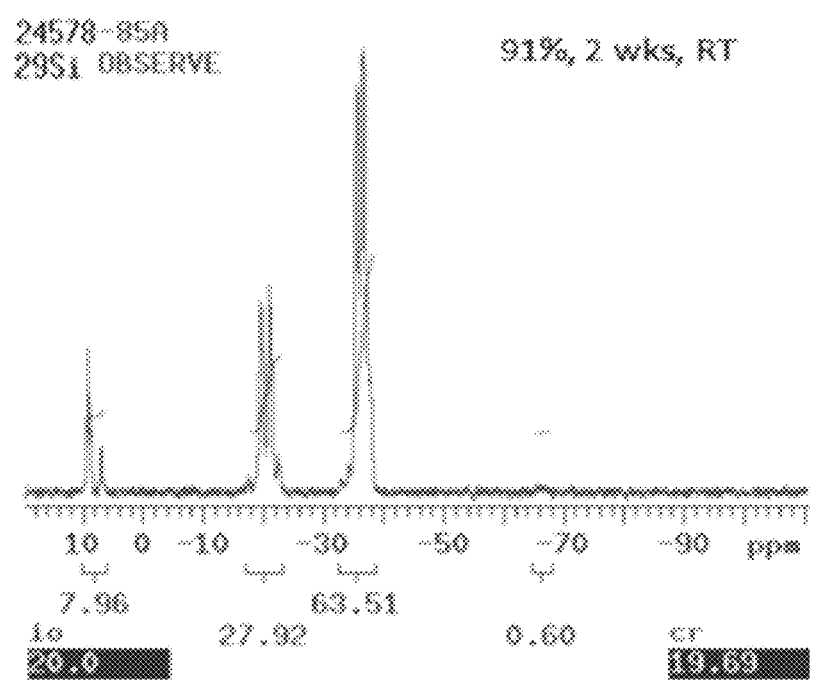
FIG. 5 is a $^{29}$Si NMR spectrum of the emulsion in Example 5 after room temperature aging for 2 weeks.
Figure 6A:
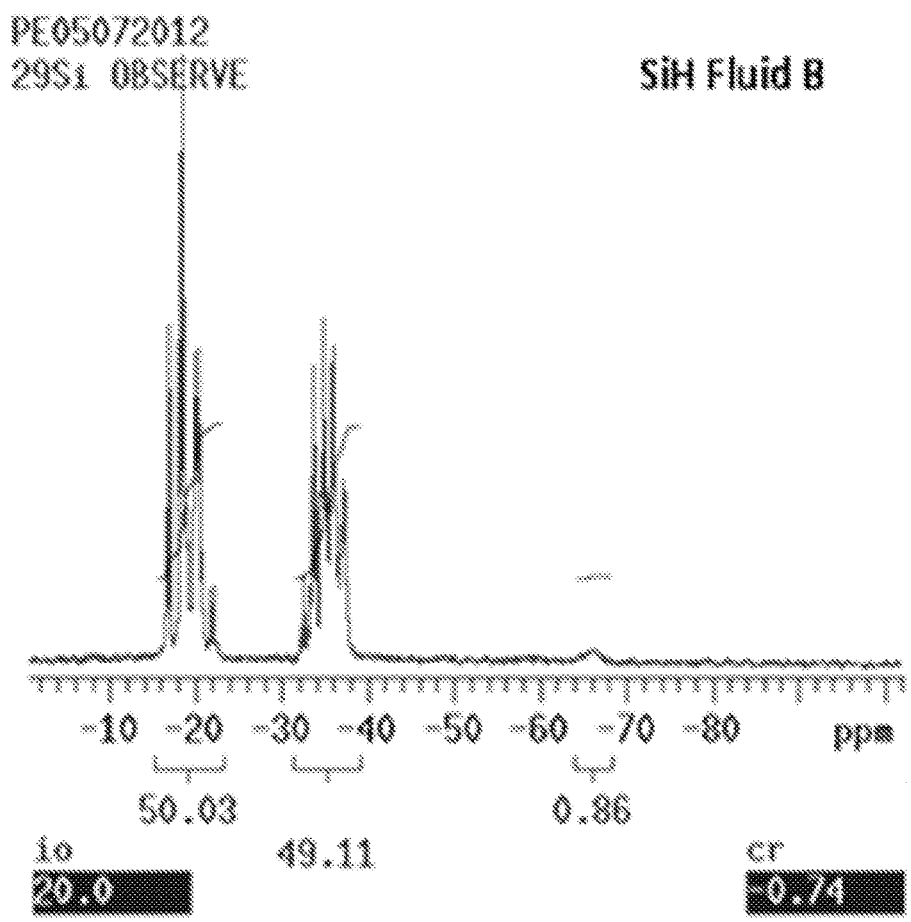
FIG. 6A is a $^{29}$Si NMR spectrum of the SiH Fluid B of Example 11 after aging at room temperature and 50° C. for 1 month.
Figure 6B:
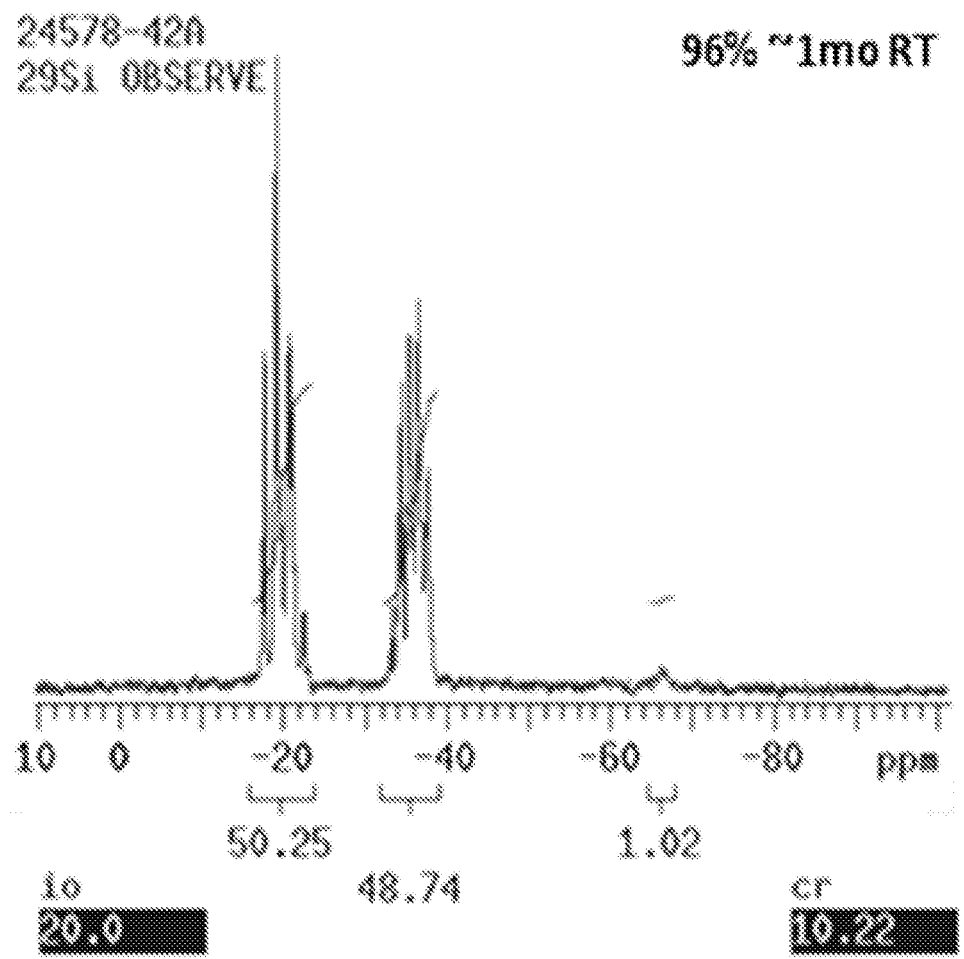
FIG. 6B is a $^{29}$Si NMR spectrum of the emulsion in Example 11 after room temperature aging for 1 month.
Figure 6C:
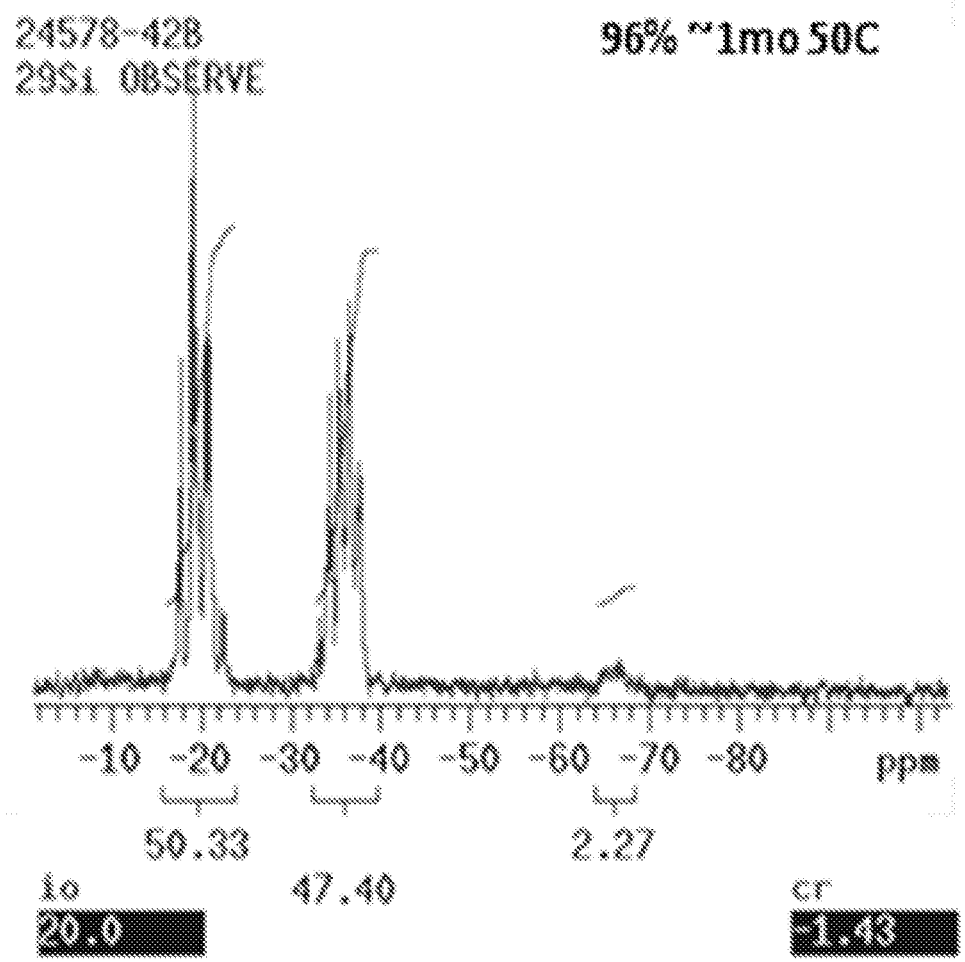
FIG. 6C is a $^{29}$Si NMR spectrum of the emulsion in Example 11 after 50° C. aging for 1 month.
Figure 6D:
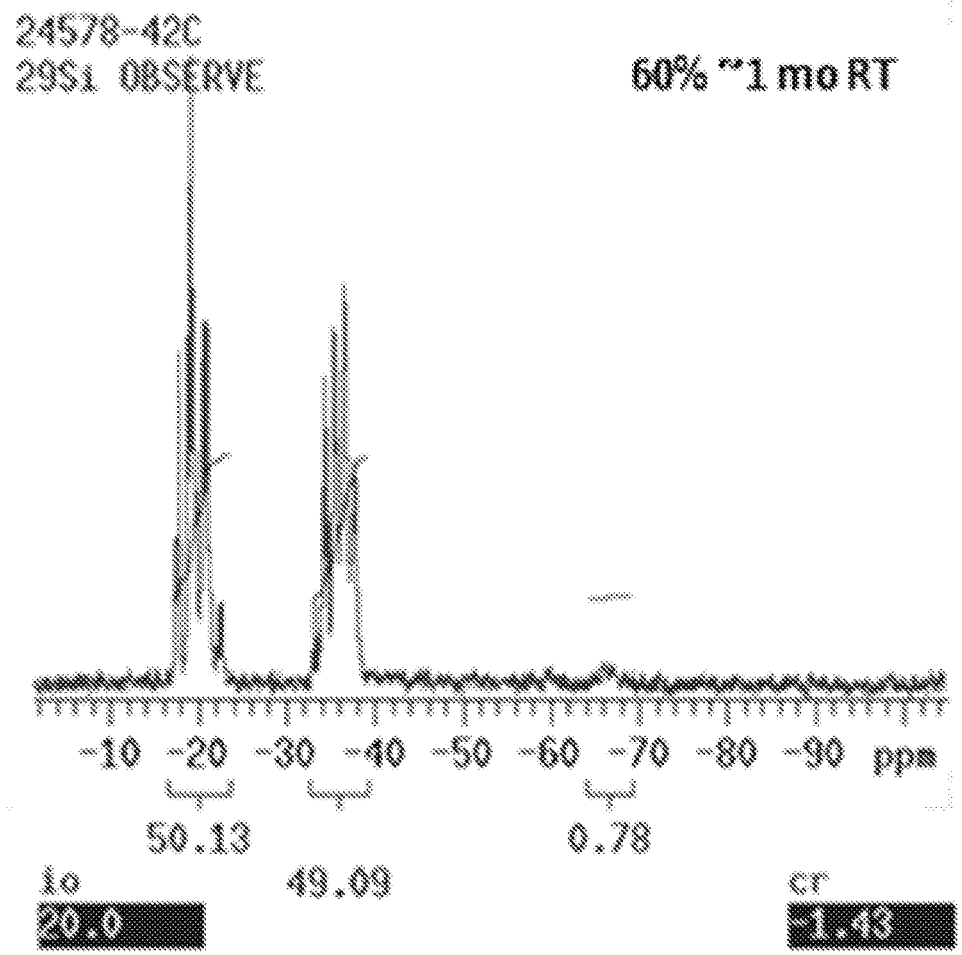
FIG. 6D is a $^{29}$Si NMR spectrum of the diluted emulsion in Example 11 after room temperature aging for 1 month.
Figure 6E:
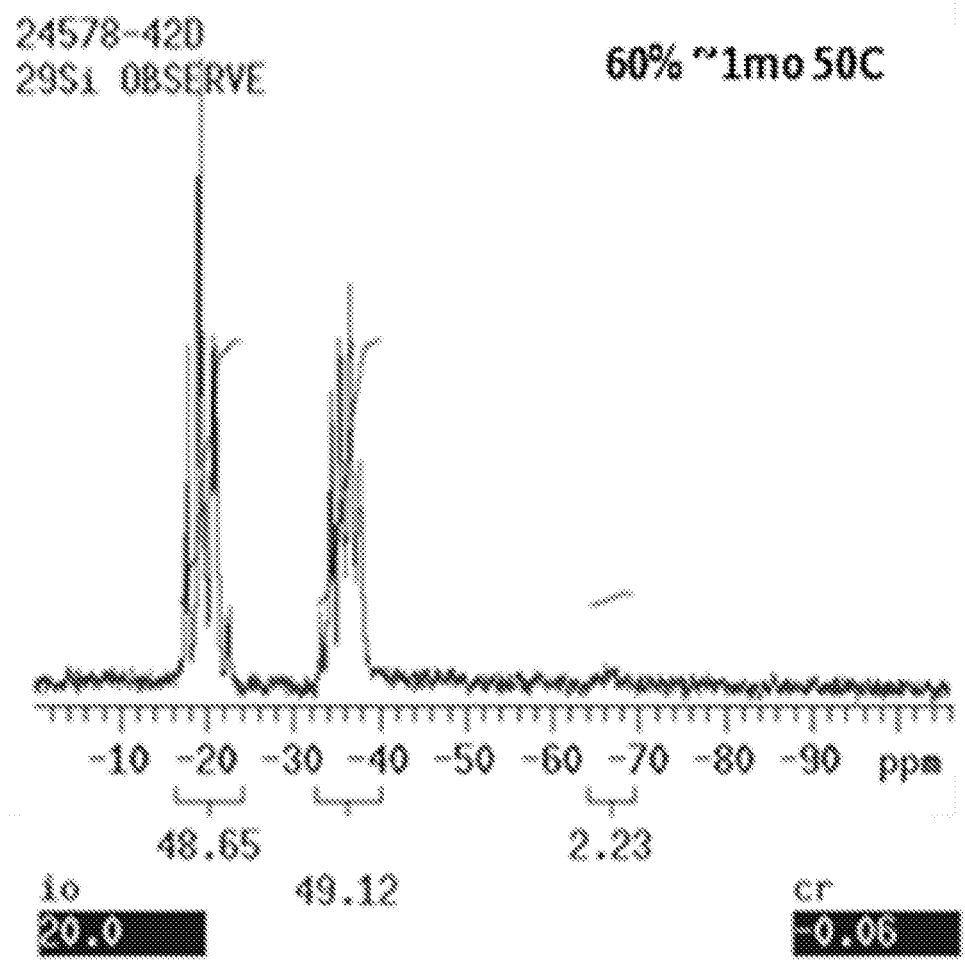
FIG. 6E is a $^{29}$Si NMR spectrum of the diluted emulsion in Example 11 after 50° C. aging for 1 month.
Figure 7A:
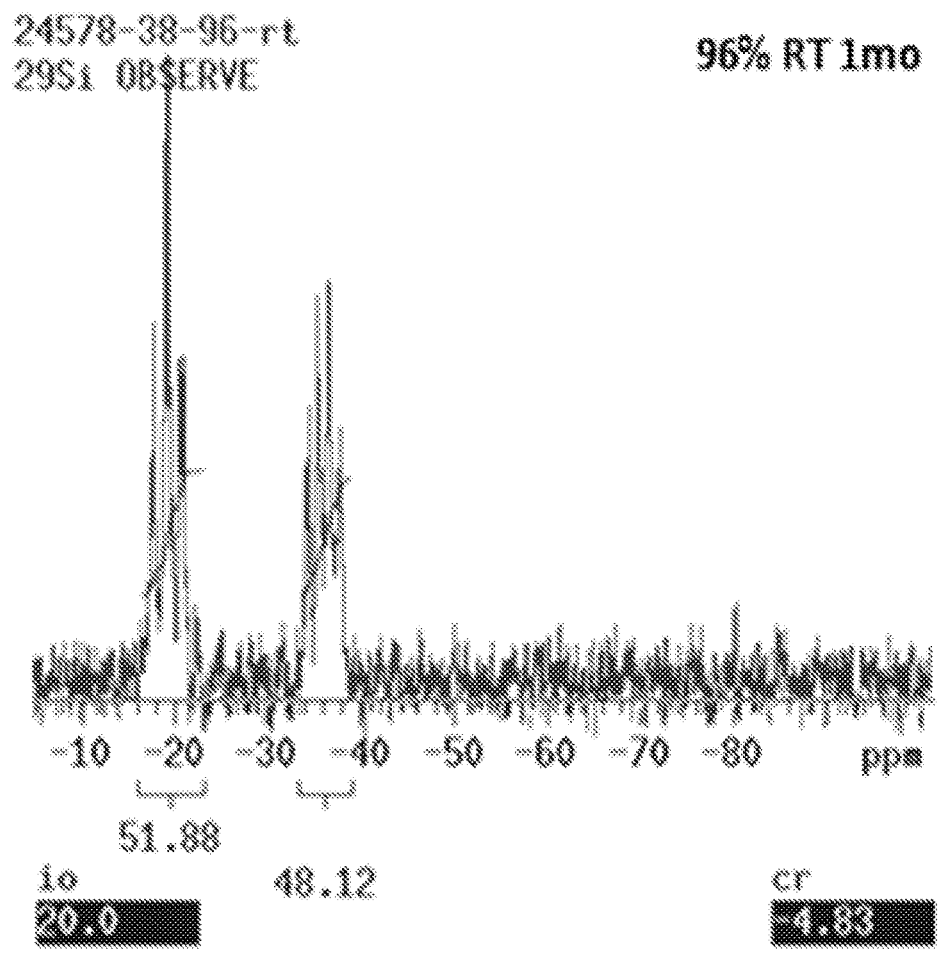
FIG. 7A is a $^{29}$Si NMR spectrum of the emulsion (96% oil content) of Example 12 after aging at room temperature for 1 month.
Figure 7B:
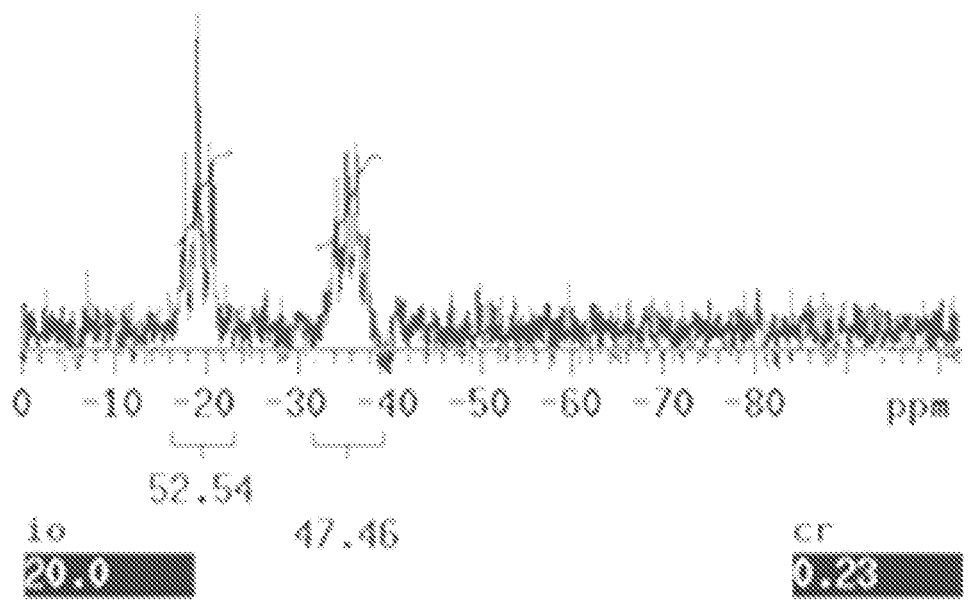
FIG. 7B is a $^{29}$Si NMR spectrum of the emulsion (96% oil content) of Example 12 after aging at 50° C. for 1 month.
Figure 7C:
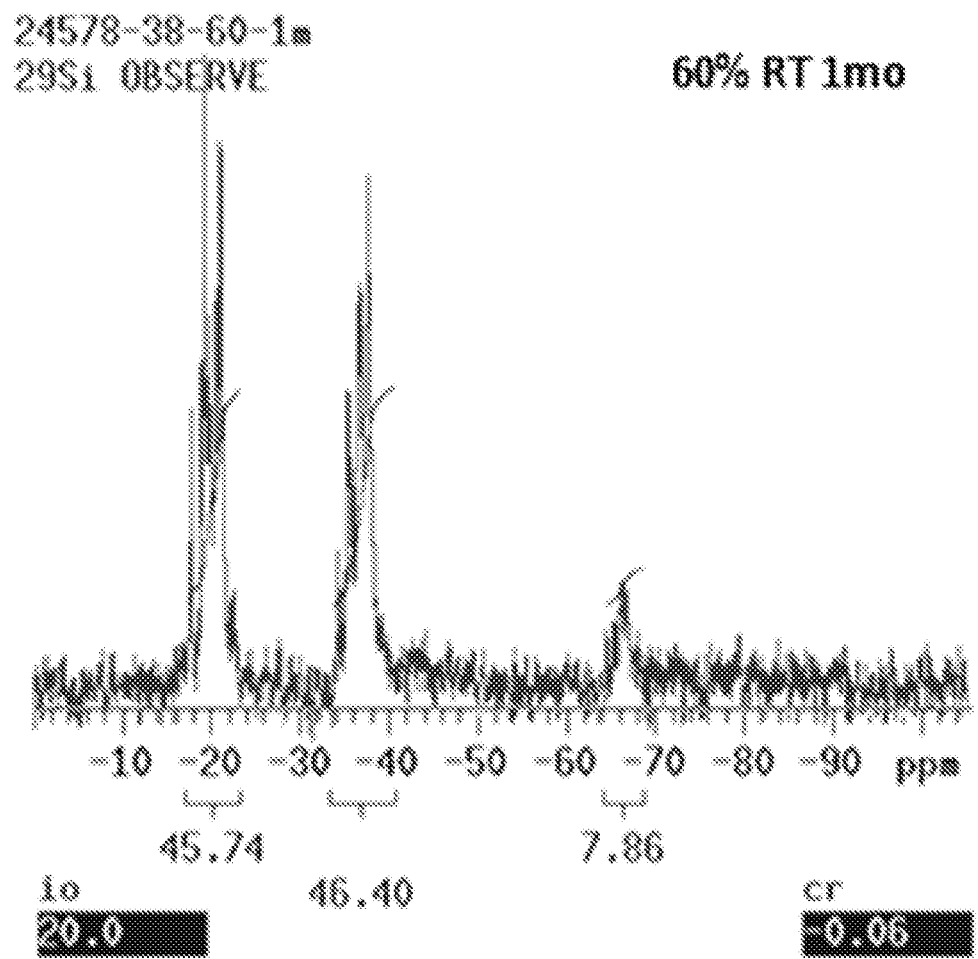
FIG. 7C is a $^{29}$Si NMR spectrum of the diluted emulsion in Example 12 after room temperature aging for 1 month.
Figure 7D:
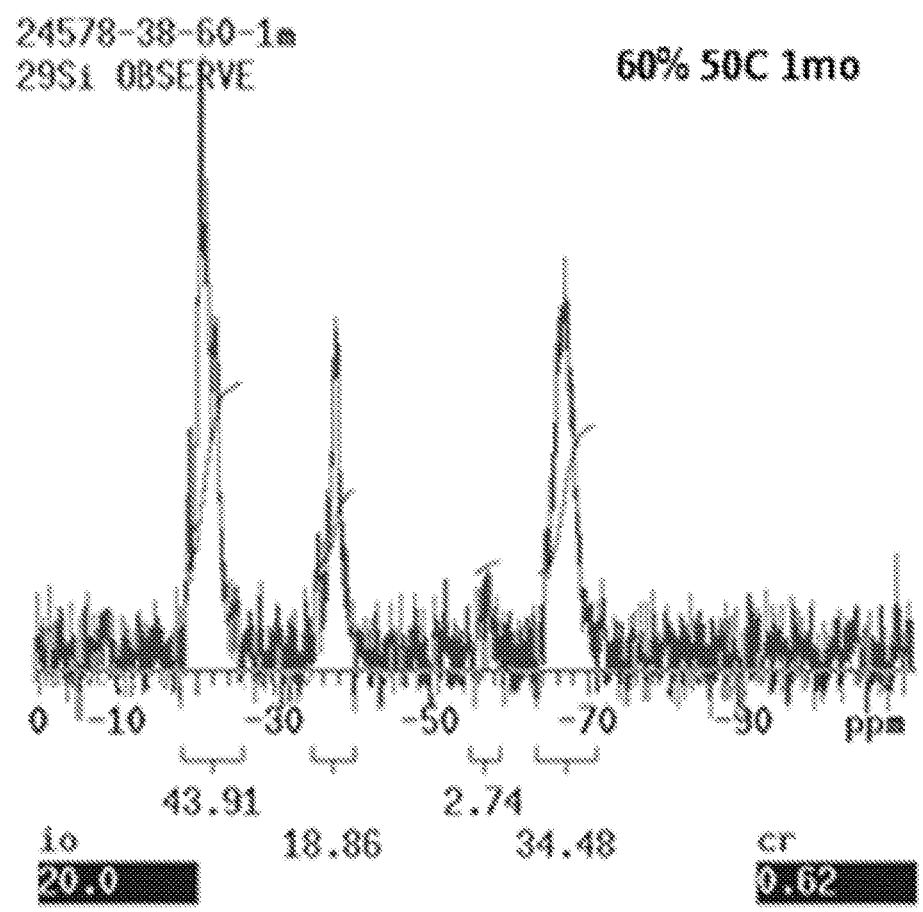
FIG. 7D is a $^{29}$Si NMR spectrum of the diluted emulsion in Example 12 after 50° C. aging for 1 month.

FIG. 5 is a $^{29}$Si NMR spectrum of the emulsion in Example 5 after room temperature aging for 2 weeks. The spectrum is to be compared with that of the Dow Corning® 2-5084 Fluid displayed in FIG. 1A. Peak assignments are as described in FIG. 1.

Example 6

The procedure of Example 3 was followed except that the additional Dow Corning® 2-5084 Fluid, as a second oil phase/hydrolyzable silicon containing compound, was added to the seed emulsion at a rate of 0.92 grams per minute. An emulsion was initially formed during the dispersion procedure until at a later stage when the last portion of the fluid stopped being dispersed as internal emulsion drops into the emulsion. This resulted in formation of gel crumbs in a continuous bed of oil (the fluid).

Example 7

The procedure of Example 3 was followed except that the additional Dow Corning® 2-5084 Fluid, as a second oil phase/hydrolyzable silicon containing compound, was added to the seed emulsion at a rate of 8.76 grams per minute. This did not result in complete incorporation of the fluid, as a dispersed phase, into the emulsion. The final system appeared to be white chunks in a continuous bed of oil (the fluid).

Example 8

The procedure of Example 3 was followed except that the dispersion of the additional Dow Corning® 2-5084 Fluid, as a second oil phase/hydrolyzable silicon containing compound, was carried out using a combination of a Cowles blade at the bottom of the stirring shaft and a marine blade at the top and that the mixing rate was at 1000 RPM. An emulsion initially formed during the first half of the dispersion procedure. However, during the second half of the procedure, fluid stopped being dispersed into the emulsion. Instead, the initial emulsion was broken and the final system appeared to be white chunks in a continuous bed of oil (the fluid).

Example 9—Comparative Example Using High Shear Emulsification

To a 20 gram maximum Speed Mixer™ cup were weighed 9.5 g of Dow Corning® 2-5084 Fluid and 0.5 g of the surfactant solution from Example 1. The content was sheared at 3500 RPM for 30 seconds using a DAC-150 Speed Mixer™. No emulsion was formed.

Example 10—Comparative Example Using Inversion

To a 200 mL stainless steel beaker was added 96 grams of Dow Corning® 2-5084 Fluid. The content was agitated using a Lightnin® mixer equipped with an impeller with a Cowles blade set at a speed of 750 RPM. To the contents was slowly added 4 grams of the surfactant solution made according to the procedure in Example 1. This did not result in the formation of any emulsion. To the system was then added another 2 grams of the same surfactant solution. No emulsion was formed.

Example 11

Seed Emulsion: To a 8 ounce wide-mouth glass jar was added 50 grams of SiH Fluid B, 6 grams Tergitol® 15-S-12 and 5 grams Tergitol® 15-S-5, both nonionic surfactants. The content was mixed using an Ultra Turrax® disperser at 9,500 RPM for 30 seconds. To the content was added 39 grams of deionized water and further mixed with the Ultra Turrax® disperser at 17,500 RPM for 60 seconds. This resulted in a seed emulsion having a monomodal particle size distribution centered around a Dv(0.5) of 0.60 micron, as measured using a Malvern Mastersizer 2000 particle size analyzer.

Dispersion of Second Phase: To a 500 mL stainless steel beaker was added 16 grams of the seed emulsion described above. The content was stirred using a Lightnin® mixer equipped with an impeller with a marine blade. To the content was added 184 grams of SiH Fluid B, as a second oil phase/hydrolyzable silicon containing compound, at a slow rate of between 1 and 5 grams per minute while under a constant mixing speed of 800 RPM. This resulted in a white emulsion including 96% hydrolysable Si compound and 0.88% surfactant. The emulsion had a bimodal particle size distribution displaying one peak centered around 0.12 micron and another peak around 1.8 microns.

Dilution of the Emulsion: A portion of the emulsion was transferred to a container and water was added at a ratio of 1 part of the emulsion to 0.6 parts of water. The content was stirred by hand using a spatula. A homogeneous white liquid emulsion was formed which includes 60% of the hydrolysable Si compound.

Both the emulsion including 96% oil content and the liquid emulsion including 60% oil content were divided into two samples each, one kept in closed container at room temperature while the other kept in closed container at 50° C. After one month storage, four samples were observed to be essentially the same in appearance. $^{29}$Si NMR spectra are acquired and are displayed in FIG. 6. All four spectra show negligible SiH hydrolysis in the emulsion as compared with the neat SiH Fluid B without being put in an emulsion. Thus both the emulsion and the hydrolysable Si compound in the emulsion were stable either in an emulsion or in a diluted emulsion form when the emulsion was made using nonionic surfactants.

FIGS. 6A-E are $^{29}$Si NMR spectra of the SiH Fluid B (6A) and of the emulsion (96% oil content) and the diluted emulsion (60% oil content) made of the fluid in Example 11 after aging at room temperature and 50° C. for 1 month.

Example 12

Seed Emulsion: To a 8 ounce wide-mouth glass jar was added 50 grams of SiH Fluid B, 20 grams Hostapur® SAS-30 (Sodium C14-17 alkyl sec sulfonate, an anionic surfactant, 30% active in water), and 5 grams Bio Soft N1-5 (Undeceth-5, a nonionic surfactant). The content was mixed using an Ultra Turrax® disperser at 9,500 RPM for 20 seconds. To the content was added 25 grams of deionized water and further mixed with the Ultra Turrax® disperser at 17,500 RPM for 60 seconds. This resulted in a seed emulsion having a monomodal particle size distribution centered around a Dv(0.5) of 1.2 microns, as measured using a Malvern Mastersizer 2000 particle size analyzer.

Dispersion of Second Oil Phase: To a 500 mL stainless steel beaker was added 32 grams of the seed emulsion obtained above. The content was stirred using a Lightnin® mixer equipped with an impeller with a marine blade. To the content was added 368 grams of SiH Fluid B, as a second oil phase/hydrolyzable silicon containing compound, at a constant rate of 0.82 grams per minute while under a constant mixing speed of 280 RPM. This resulted in a white emulsion including 96% hydrolysable Si compound and 0.88% surfactant. The emulsion had a monomodal particle size distribution with Dv(0.5) of 2.5 microns and Dv(0.9) of 5.3 microns.

Dilution of the Emulsion: A portion of the emulsion was transferred to a container and was added with deionized water at a ratio of 1 part of the emulsion to 0.6 part of water. The content was stirred by hand using a spatula. A homogeneous white liquid emulsion was arrived which includes 60% of the hydrolysable Si compound.

Both the emulsion including 96% oil content and the liquid emulsion including 60% oil content were divided into two samples each, one kept in closed plastic container at room temperature while the other kept in closed plastic container at 50° C. After one month storage, the four samples were inspected and tested. Both the emulsion samples showed that part of the oil phase separate out from the remaining emulsions. Both the diluted emulsion samples show creaming phenomenon (denser emulsion on the top and thinner emulsion on the bottom), and both containers bulge indicating pressure build-up in the closed container due to hydrolysis of SiH giving off hydrogen gas. $^{29}$Si NMR spectra are displayed in FIG. 7, which show no sign of SiH hydrolysis in the emulsion, whether after storage at room temperature or at 50° C. whereas the diluted emulsion samples both showed hydrolysis and condensation. Thus, when an anionic surfactant was used in emulsifying SiH including siloxanes, hydrolysis was prevented only in emulsions having an exceedingly high oil content, or equivalently, a very low water content.

FIG. 7 is a $^{29}$Si NMR spectrum of the emulsion (96% oil content) and the diluted emulsion (60% oil content) in Example 12 after aging at room temperature and 50° C. for 1 month.

Example 13

Seed Emulsion: To a 500 mL stainless steel beaker was added 16 grams of the surfactant solution made according to Example 1. The content was stirred using a Lightnin® mixer equipped with a impeller with a marine blade. To the content was added 16 grams of SiH Fluid B dropwise under a constant mixing speed of 800 RPM to arrive at a seed emulsion.

Dispersion of Second Oil Phase: To 32 grams of the seed emulsion obtained above was added 368 grams of SiH Fluid B stream-wise, as a second oil phase/hydrolyzable silicon containing compound, under a constant stirring speed of 250 RPM using the same mixer. This resulted in a white emulsion including 96% hydrolysable Si compound and 0.88% surfactant. The emulsion had a bimodal particle size distribution displaying one peak centered around 1.2 micron and another peak around 7.0 microns. A portion of the emulsion was diluted with water using spatula to a white fluid emulsion including 60% oil content. Both the emulsion and the diluted emulsion were kept in closed containers at 50° C. for two weeks after which there were inspected and tested. The emulsion sample had a thin layer of oil (<10% per sample) on the top which was separated from the remaining emulsion but was otherwise intact. The diluted emulsion sample showed creaming phenomenon and the container bulged indicating pressure built up due to SiH hydrolysis releasing hydrogen gas. $^{29}$Si NMR spectra are displayed in FIG. 8, which show negligible SiH hydrolysis in the emulsion but significant hydrolysis and condensation in the diluted emulsion. Thus, when anionic surfactant was used in emulsifying SiH including siloxanes, hydrolysis was prevented only in emulsions having an exceedingly high oil content, or equivalently, a very low water content.

Figure 8A:
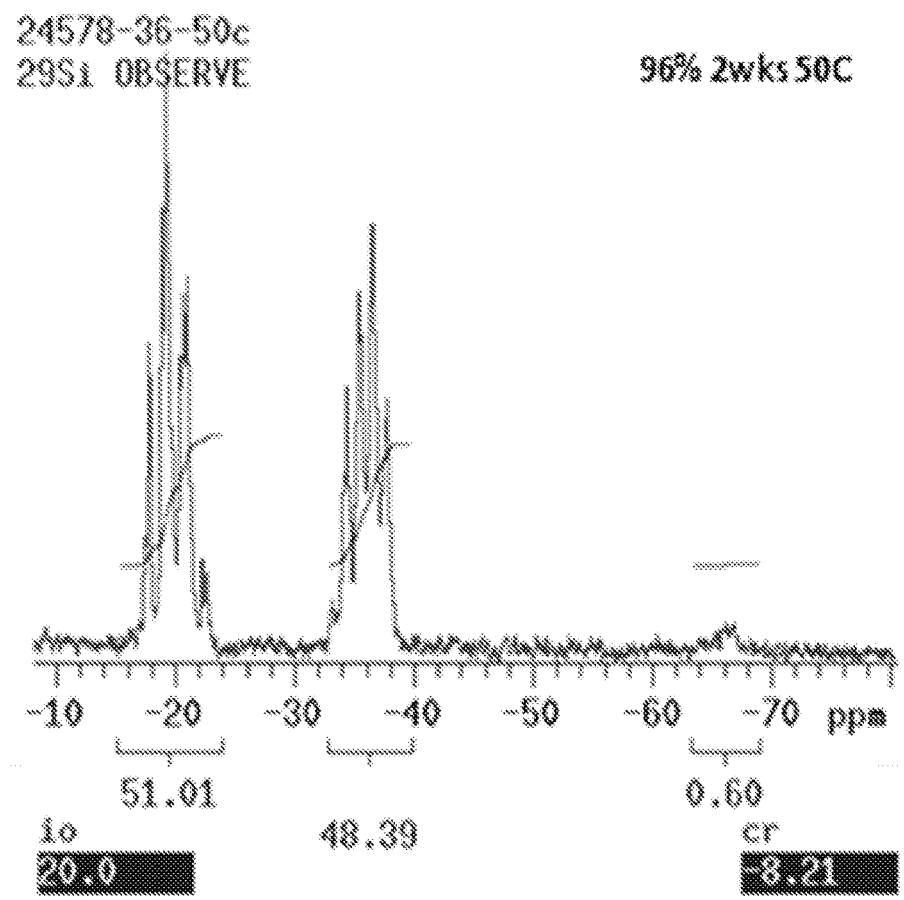
FIG. 8A is a $^{29}$Si NMR spectrum of the emulsion (96% oil content) of Example 13 after aging at 50° C. for 2 weeks.
Figure 8B:
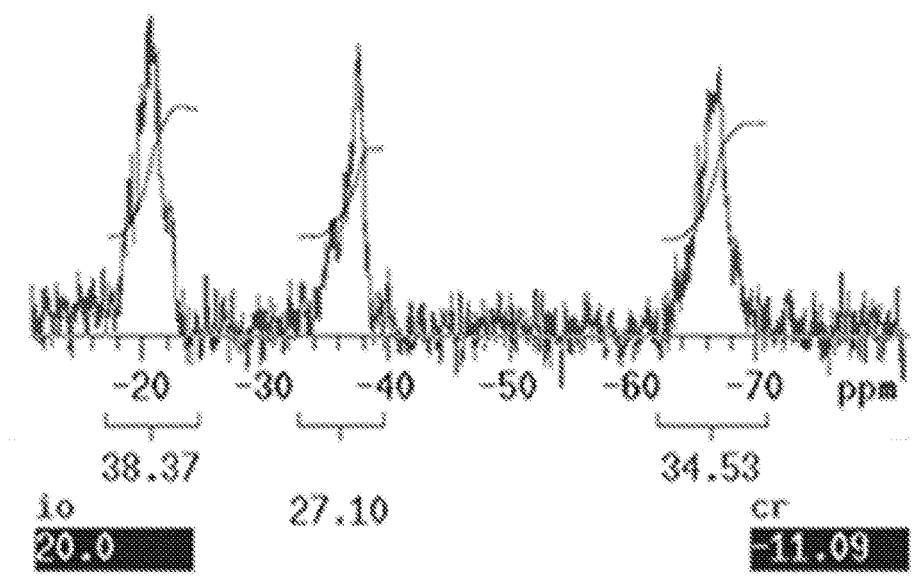
FIG. 8B is a $^{29}$Si NMR spectrum of the diluted emulsion (60% oil content) of Example 13 after aging at 50° C. for 2 weeks.

FIG. 8 is a $^{29}$Si NMR spectrum of the emulsion (96% oil content) and the diluted emulsion (60% oil content) in Example 13 after aging at 50° C. for 2 weeks.

Example 14

Figure 9:
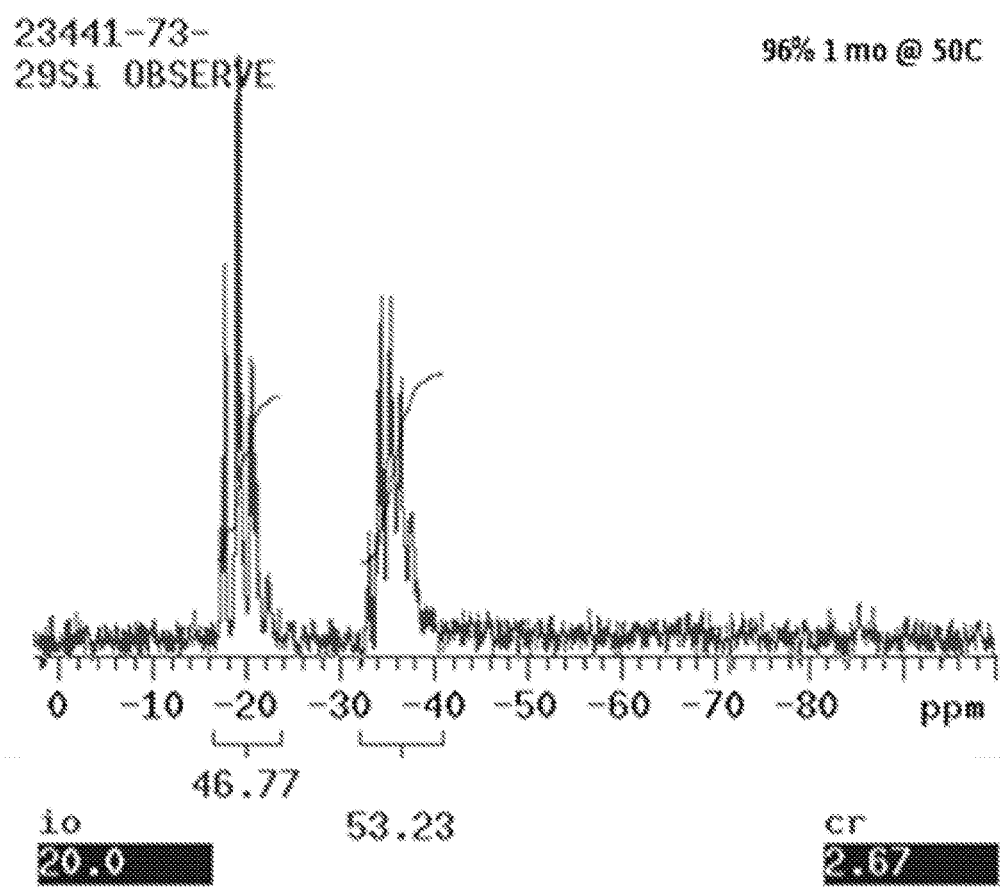
FIG. 9 is a $^{29}$Si NMR spectrum of the emulsion in Example 14 after aging at 50° C. for 1 month.

The procedure of Example 13 was followed except that the SiH Fluid B was added dropwise under a constant stirring speed of 175 RPM using the same mixer during the entire process, that was, for both the seed emulsion and the additional dispersion. The final emulsion was a white emulsion including 96% hydrolysable Si compound and 0.88% surfactant. The emulsion had a monomodal particle size distribution with Dv(0.5) of 2.5 microns and Dv(0.9) of 4.7 microns. The emulsion was stored at 50° C. for 1 month after which it was inspected and tested. The emulsion appears the same as fresh. A $^{29}$Si NMR spectrum is displayed in FIG. 9, which shows no sign of SiH hydrolysis. FIG. 9 is a $^{29}$Si NMR spectrum of the emulsion in Example 14 after aging at 50° C. for 1 month.

Example 15—Comparative Example Using the Method of Direct Emulsification with High Shear and Typical Oil Phase Content In this example, a conventional emulsification method suitable for emulsifying a low viscosity oil phase was used. The method entailed first forming a coarse emulsion including all the ingredients and then passing the coarse emulsion through a high shear device, such as a high pressure homogenizer, to arrive at a fine emulsion, as described in U.S. Pat. No. 6,074,470. Hostapur® SAS-30, Brij® L23-69 (formerly Brij® 35L, laureth-23, a nonionic surfactant, 69% active in water) and Synperonic® 13/12 (trideceth-12, a nonionic surfactant) were used as primary surfactants and Span® 20 (sorbitan laurate, a nonionic surfactant) was used as a co-surfactant. A silicone surfactant, Dow Corning® Q2-5211 Superwetting Agent was also used.

In a Nalgene bottle were added 160 grams of SiH Fluid B, 1.35 grams Brij® L23-69, 0.59 gram Synperonic® 13/12, 1.93 grams Span® 20 and 6.64 grams Hostapur® SAS-30. The content was mixed using an Ultra Turrax® disperser at 17,500 RPM for 60 seconds. To the mixer was then added 231.44 grams deionized water and mixed with the Ultra Turrax® dispenser at 17,500 RPM for 5 minutes to form a coarse emulsion. The coarse emulsion was passed through a homogenizer (SPX Corp., Charlotte, N.C.) at a pressure of 10,000 PSI five times to arrive at a white fine emulsion. To the emulsion was last added 1.51 gram Dow Corning® Q2-5211 Superwetting Agent and mixed with a Lightnin® mixer. The final emulsion includes 40% hydrolysable Si compound and a combined 1.72% surfactant. This emulsion had monomodal particle size distribution with Dv(0.5) of 0.342 micron and Dv(0.9) of 0.625 micron. A portion of the emulsion was stored in a closed plastic container at 50° C. while the rest stored in at room temperature. Both samples were stored at room temperature and at 50° C. show pressure buildup after only a few days indicative of SiH hydrolysis releasing hydrogen gas. After a month storage at 50° C., $^{29}$Si NMR spectrum was acquired of the emulsion sample which was compared with the spectrum acquired of the fresh emulsion immediately after made. Resulted in were displayed in FIG. 10, which shows significant hydrolysis and condensation after storage.

Figure 10A:
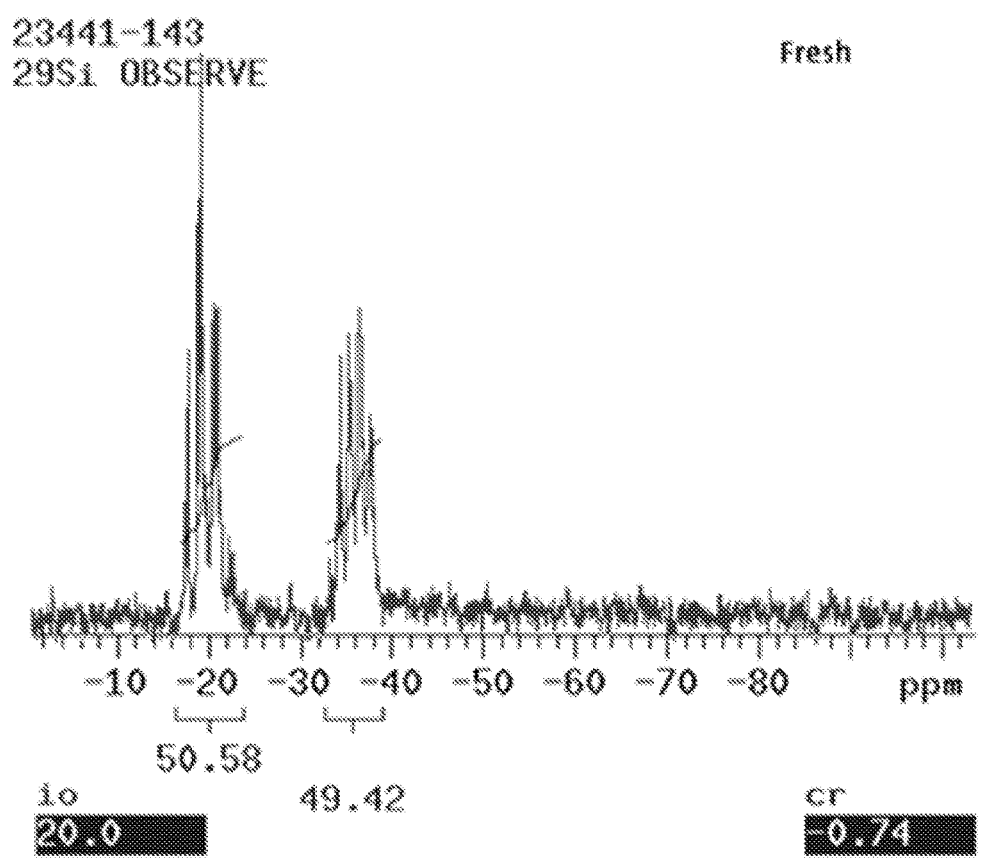
FIG. 10A is a $^{29}$Si NMR spectrum of the emulsion (40% oil content) in Example 15 as made.
Figure 10B:
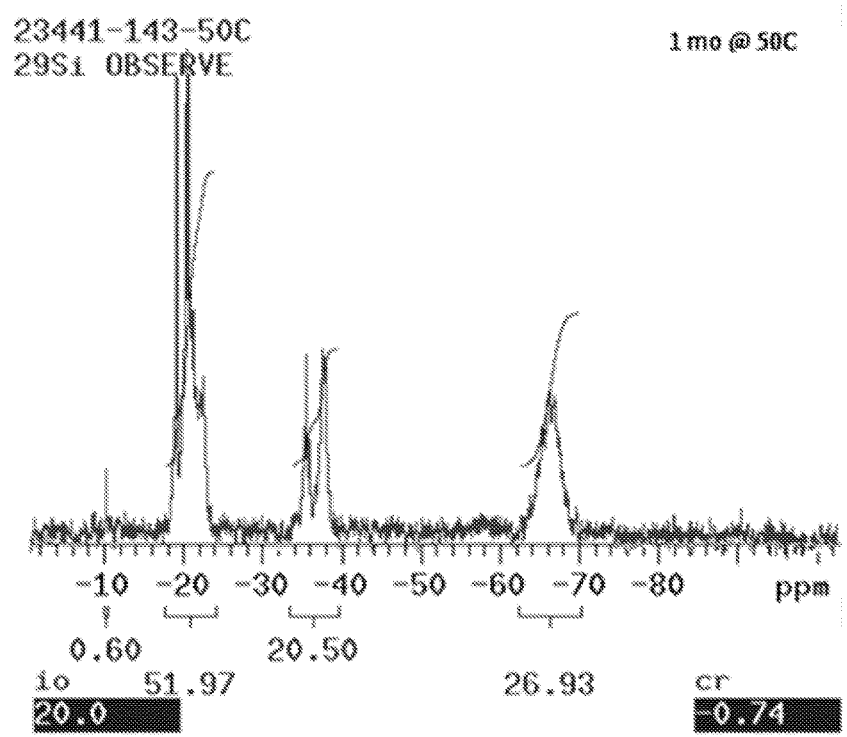
FIG. 10B is a $^{29}$Si NMR spectrum of the emulsion (40% oil content) in Example 15 after aging at 50° C. for 1 month.

FIG. 10 is a $^{29}$Si NMR spectra of the emulsion (40% oil content) in Example 15 as made (left) and after aging at 50° C. for 1 month (right). Peak assignments are as described in FIG. 6.

Example 16

Seed emulsion: In a 100 mL wide-mouth glass jar was added 2.51 grams Tergitol® 15-S-5, 3.0 grams Tergitol® 15-S-12, 19.5 grams deionized water and 25.0 grams Dow Corning® Z-6341 Silane. The content was sonicated using a Misonix Sonicator 3000 Ultrasonic Liquid Processor at maximum power for 30 seconds. The sample was capped and gently toggled, then sonicated again for another 30 seconds. This produced a seed emulsion having a volume averaged median particle size of 0.24 micron, as measured using a Malvern Mastersizer 2000 particle size analyzer.

Dispersion of Second Oil Phase: In a 500 mL stainless steel beaker was added 40.0 grams of the seed emulsion from above. The content was stirred using a Lightnin® mixer equipped with a marine blade impeller. To the seed emulsion was added first 60.0 grams Dow Corning® Z-6341 Silane and then 300.0 grams Dow Corning® 5084 Fluid, each at a constant rate of 4.24 grams per minute and under a constant mixing speed of 175 RPM. This resulted in a white creamy emulsion containing 20% Z-6341 (hydrolyzable silane), 75% 5084 (hydrolyzable SiH siloxane) 96% and 1.10% surfactant. The creamy emulsion had a bimodal particle size distribution displaying one peak centered around 1 micron and another peak around 12 microns. A portion of the creamy emulsion was subsequently mixed using a DAC-150 Speed Mixer™ at 3500 RPM for two 30-second cycles to arrive at an emulsion having a monomodal particle size distribution with Dv(0.5) of 3.0 microns and Dv(0.9) of 4.7 microns.

Example 17

Seed Emulsion: In a 500 mL stainless steel beaker was added 36.0 grams Dow Corning® Z-70 Emulsion which was used as the seed emulsion. The content was stirred using a Lightnin® mixer equipped with a marine blade impeller.

Dispersion of Second Oil Phase: To the seed emulsion was added a mixture containing 361.2 grams of Dow Corning® 5084 Fluid, 2.24 grams Tergitol® 15-S-9 and 0.56 gram Tween® 20 at a constant rate of 5.52 grams per minute while under a constant mixing speed of 175 RPM. This resulted in a white emulsion containing 90.3% hydrolysable Si compound, 5.4% non-hydrolysable silicone fluid and 0.97% total surfactant. The emulsion had a bimodal particle size distribution displaying one peak centered around 1 micron and another peak around 6 microns. The emulsion was kept in closed containers at room temperature for two weeks after which it was inspected and tested. Particle size distribution remained the same and there was no indication of SiH hydrolysis in $^{29}$Si NMR spectrum.

Example 18

Seed Emulsion: In a 500 mL stainless steel beaker was added 37.0 grams Dow Corning® IE-6694 Water Repellent Emulsion which was used as the seed emulsion. The content was stirred using a Lightnin® mixer equipped with a marine blade impeller.

Dispersion of Second Oil Phase: To the seed emulsion was added a mixture containing 358.0 grams of SiH Fluid B, 2.0 grams Brij® L-4 and 3.0 grams Brij® L23-69 at a constant rate of 3.82 grams per minute while under a mixing speed ranging from 175 to 300 RPM. This resulted in an emulsion containing 95.1% combined hydrolysable and non-hydrolysable Si compound. The emulsion had a bimodal particle size distribution displaying one peak centered around 1 micron and another peak around 6.5 microns. The emulsion was inspected after two weeks storage at room temperature in a closed container and the appearance remained the same.

In various non-limiting embodiments, this disclosure expressly contemplates and herein affirmatively includes one or more components, articles, method steps, analytical determinations, compounds, and/or physical properties described in PCT/US2012/056118, which is expressly incorporated herein by reference in its entirety relative to these non-limiting embodiments.

One or more of the values described above may vary by ±5%, ±10%, ±15%, ±20%, ±25%, etc., so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

What is claimed is:

1. A method of forming a hydrolysis resistant aqueous emulsion comprising a hydrolyzable silicon containing compound, said method comprising the steps of:
   A. forming a seed emulsion comprising;
      (1) an emulsifier,
      (2) water, and
      (3) a first oil phase; and
   B. adding a second oil phase comprising a hydrolyzable silicon containing compound to the seed emulsion;
   wherein a weight ratio of the second oil phase comprising a hydrolyzable silicon containing compound to the first oil phase of the seed emulsion is from 0.5 to 50, wherein a total weight of the two oil phases in the emulsion is at least 60 weight percent and wherein a ratio of a molar concentration of water to a total molar concentration of the hydrolyzable silicon in the aqueous emulsion is less than 2.

2. The method of claim 1 wherein the first oil phase comprises a hydrolyzable silicon containing compound that may be the same or different from the hydrolyzable silicon containing compound in the second oil phase of (B).

3. The method of claim 1 wherein the hydrolyzable silicon containing compound of the second oil phase is a hydrolyzable silane or a hydrolyzable siloxane.

4. The method of claim 2 wherein the hydrolyzable silicon containing compound of the first oil phase is a hydrolyzable silane or a hydrolyzable siloxane.

5. The method of claim 2 wherein each of the hydrolyzable silicon containing compounds of the first and second oil phases is independently chosen from:
   (i) an organohydrogensiloxane having the formula;

  (I), or

  (II), wherein;
      R is an alkyl radical having 1 to 4 carbon atoms;
      R' is an alkyl radical having 1 to 18 carbon atoms;
      R''' is hydrogen or R;
      a is a number from 0 to 35;
      b is a number from 0 to 32; and
      c and d are each independently a number from 1 to 10, (ii) an alkoxysilane having the formula;

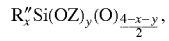  (III)

wherein
      R" is an alkyl radical having 1 to 18 carbon atoms or an aryl radical;
      Z is a hydrogen atom, an alkyl group having 1 to 4 carbon atoms, $CH_3C(O)-$, $CH_3CH_2C(O)-$, $HOCH_2CH_2-$, $CH_3OCH_2CH_2-$, or $C_2H_5OCH_2CH_2-$;
      x has an average value from 0 to 2,
      y has an average value from 0.1 to 4, and
      x+y has a value equal to or less than 4.

6. The method of claim 5 wherein c is less than 3, d is equal to or greater than 2 and the sum of c and d is between 4 and 6.

7. The method of claim 1 wherein the first oil phase and/or the second oil phase further comprises a non-hydrolyzable silicon containing compound.

8. The method of claim 2 wherein the hydrolyzable silicon containing compound has a Volatile Organic Content below 100 g/L measured according to ASTM 5095 or below 50 g/L measured according to ASTM 5095.

9. The method of claim 1 wherein the first and/or the second oil phase comprises a silicone oil, a hydrocarbon oil or a fluorocarbon oil, or combinations thereof.

10. The method of claim 1 further comprising the step of adding a second emulsifier to the second oil phase, wherein the second emulsifier which may be the same or different from the emulsifier of the seed emulsion.

11. The method of claim 1 wherein the hydrolysis resistant emulsion is free of a thickener.

12. A hydrolysis resistant aqueous emulsion prepared by the method of claim 1.

13. A method comprising the step of applying a hydrolysis resistant aqueous emulsion to a substrate, wherein the substrate is chosen from cement, clays, lime, gypsum or natural stone, concrete, mortar, masonry, cement, stucco, natural or artificial stone, ceramic, terracotta bricks, plaster board, fiber cement board, cellulosic substrates, wood, composite particle board, wood plastic composites, oriented strand board, medium density fiber board, and wherein the emulsion is prepared by the method of claim 1.

14. The method of claim 13 wherein the emulsion is applied to the substrate in a thickness of less than 2 millimeters.

15. The method of claim 14 wherein the substrate is oriented approximately perpendicularly to a support and the emulsion may not flow towards the support more than 5 cm from an original point of application.

* * * * *